US011571620B2

(12) United States Patent
Frappiea

(10) Patent No.: US 11,571,620 B2
(45) Date of Patent: *Feb. 7, 2023

(54) USING HMD CAMERA TOUCH BUTTON TO RENDER IMAGES OF A USER CAPTURED DURING GAME PLAY

(71) Applicant: Sony Interactive Entertainment LLC, San Mateo, CA (US)

(72) Inventor: Phillip Frappiea, Redwood City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 16/678,601

(22) Filed: Nov. 8, 2019

(65) Prior Publication Data

US 2020/0070051 A1 Mar. 5, 2020

Related U.S. Application Data

(63) Continuation of application No. 15/626,065, filed on Jun. 16, 2017, now Pat. No. 10,471,353.
(Continued)

(51) Int. Cl.
*A63F 13/497* (2014.01)
*G02B 27/01* (2006.01)
(Continued)

(52) U.S. Cl.
CPC .......... *A63F 13/497* (2014.09); *A63F 13/213* (2014.09); *A63F 13/2145* (2014.09);
(Continued)

(58) Field of Classification Search
None
See application file for complete search history.

(56) References Cited

U.S. PATENT DOCUMENTS

2012/0068913 A1* 3/2012 Bar-Zeev .......... G02B 27/0172
345/8
2012/0309530 A1* 12/2012 Lansdale ............... A63F 13/424
463/36
(Continued)

FOREIGN PATENT DOCUMENTS

JP 11300033 A * 11/1999
JP 2006068315 A * 3/2006 .......... A63F 13/213
WO WO-2016080005 A1 * 5/2016 .......... A63F 13/213

OTHER PUBLICATIONS

English WO2016080005, May 26, 2016, http://translationportal.epo.org/emtp/translate?ACTION=description-retrieval&COUNTRY=WO&ENGINE=google&FORMAT=docdb&KIND=A1&LOCALE=en_EP&NUMBER=2016080005&OPS=ops.epo.org%2F3.2&SRCLANG=ja&TRGLANG=en&apikey=TSMqTfrVAvNtryGI8QlfbozJ8DnAGIqJ&PDF=vGcgfViHwGj2 pp. 1-44 (Year: 2016).*

*Primary Examiner* — Tramar Harper
(74) *Attorney, Agent, or Firm* — Penilla IP, APC

(57) ABSTRACT

Methods and systems for presenting an image of a user interacting with a video game includes providing images of a virtual reality (VR) scene of the video game for rendering on a display screen of a head mounted display (HMD). The images of the VR scene are generated as part of game play of the video game. An input provided at a user interface on the HMD received during game play is used to initiate a signal to pause the video game and to generate an activation signal to activate an image capturing device. The activation signal causes the image capturing device to capture an image of the user interacting in a physical space. The image of the user captured by the image capturing device during game play is associated with a portion of the video game that corresponds with a time when the image of the user was captured. The association causes the image of the user to be
(Continued)

transmitted to the HMD for rendering on the display screen of the HMD.

23 Claims, 11 Drawing Sheets

Related U.S. Application Data

(60) Provisional application No. 62/357,365, filed on Jun. 30, 2016.

(51) Int. Cl.
| | | |
|---|---|---|
| *A63F 13/49* | (2014.01) | |
| *A63F 13/655* | (2014.01) | |
| *A63F 13/493* | (2014.01) | |
| *G06F 3/01* | (2006.01) | |
| *G06F 3/03* | (2006.01) | |
| *A63F 13/213* | (2014.01) | |
| *A63F 13/2145* | (2014.01) | |
| *A63F 13/335* | (2014.01) | |
| *A63F 13/44* | (2014.01) | |
| *A63F 13/53* | (2014.01) | |
| *A63F 13/87* | (2014.01) | |

(52) U.S. Cl.
CPC ............ *A63F 13/335* (2014.09); *A63F 13/44* (2014.09); *A63F 13/49* (2014.09); *A63F 13/493* (2014.09); *A63F 13/53* (2014.09); *A63F 13/655* (2014.09); *G02B 27/017* (2013.01); *G06F 3/011* (2013.01); *G06F 3/017* (2013.01); *G06F 3/0304* (2013.01); *A63F 13/87* (2014.09); *A63F 2300/66* (2013.01); *A63F 2300/8082* (2013.01); *G02B 2027/014* (2013.01); *G02B 2027/0138* (2013.01); *G02B 2027/0187* (2013.01); *G06F 3/013* (2013.01)

(56) References Cited

U.S. PATENT DOCUMENTS

| | | | | |
|---|---|---|---|---|
| 2013/0172070 A1* | 7/2013 | Kim | ............... | A63F 13/213 |
| | | | | 463/24 |
| 2014/0179421 A1* | 6/2014 | Quinn | ................ | A63F 13/00 |
| | | | | 463/31 |
| 2014/0361956 A1* | 12/2014 | Mikhailov | ............ | A63F 13/42 |
| | | | | 345/8 |
| 2014/0364197 A1* | 12/2014 | Osman | ............... | H04M 19/04 |
| | | | | 463/24 |
| 2014/0364212 A1* | 12/2014 | Osman | ............... | G06F 3/013 |
| | | | | 463/31 |
| 2015/0094142 A1* | 4/2015 | Stafford | .............. | G06F 3/017 |
| | | | | 463/31 |
| 2015/0141119 A1* | 5/2015 | Lin | ................ | A63F 13/493 |
| | | | | 463/24 |
| 2015/0224395 A1* | 8/2015 | Trombetta | ........... | A63F 13/497 |
| | | | | 463/24 |
| 2015/0281325 A1* | 10/2015 | Takaichi | ............. | A63F 13/20 |
| | | | | 715/232 |
| 2016/0341959 A1* | 11/2016 | Gibbs | ............... | A63F 13/212 |
| 2017/0289633 A1* | 10/2017 | Tokunaga | ........ | H04N 21/45455 |

\* cited by examiner

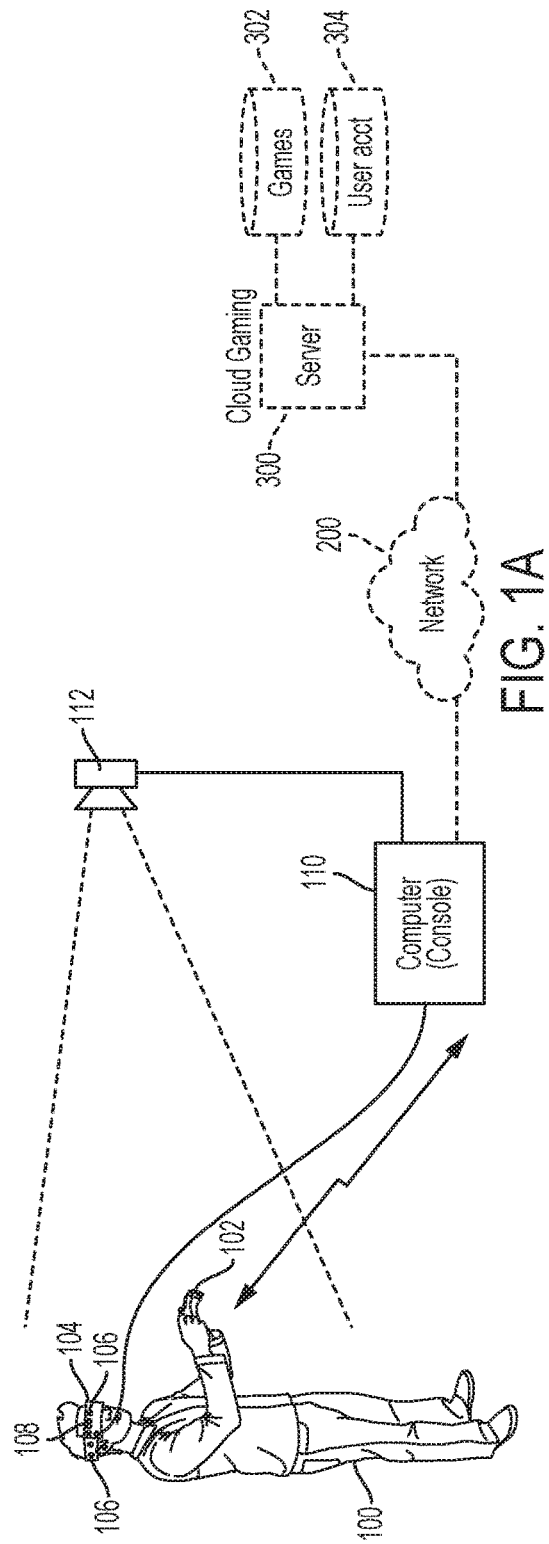
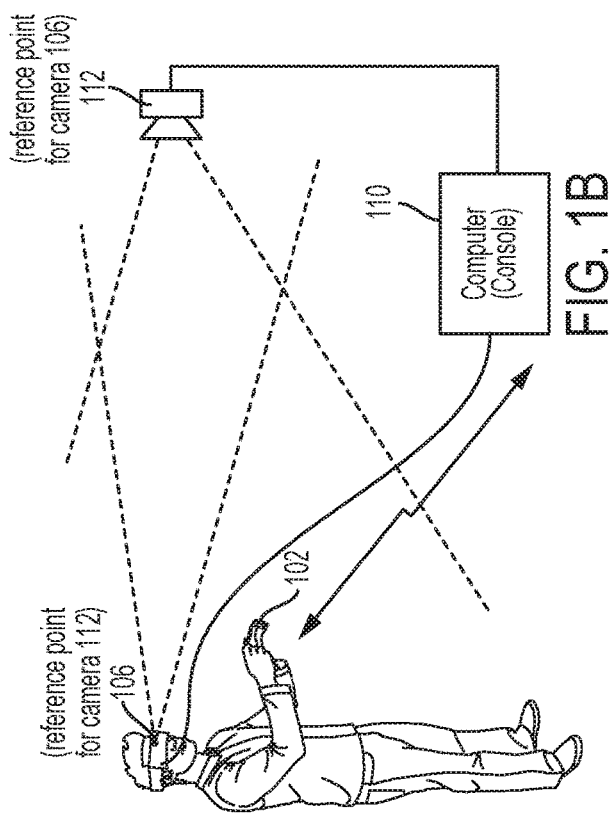
FIG. 1A
FIG. 1B

Communication architecture of a head mounted display

USING HMD CAMERA TOUCH BUTTON TO RENDER IMAGES OF A USER CAPTURED DURING GAME PLAY

CLAIM OF PRIORITY

This application is a continuation of U.S. application Ser. No. 15/626,065, filed on Jun. 16, 2017, entitled, "Using HMD Camera Touch Button to Render Images of a User Captured During Game Play," which claims priority to U.S. Provisional Patent Application No. 62/357,365, filed on Jun. 30, 2016, and entitled "Using HMD Camera Touch Button to Render Images of a User Captured During Game Play," which is incorporated herein by reference in its entirety.

FIELD

The present disclosure relates to systems and methods for presenting content for rendering on a head mounted display and, more specifically, to augmenting video game content with image of a user captured during game play.

BACKGROUND

Description of the Related Art

Computing and video gaming industry have seen many changes over the years. As computing power has expanded, developers of various interactive applications, such as video game applications, have created application software that takes advantage of the increased computing power. To this end, application developers, such as video game developers, have been developing games that incorporate sophisticated operations to increase interaction between a user and the gaming system so as to produce a very realistic game play experience.

One way of accomplishing a richer interactive experience is to use wireless game controllers whose movement is tracked by the gaming system in order to track a player's gestures and use these gestures as inputs for the game. Generally speaking, gesture input refers to having an electronic device, such as a computing system, video game console, smart appliance, etc., react to some gesture made by the player and captured by the electronic device.

Another way of accomplishing a more immersive interactive experience is to use a head-mounted display. A head-mounted display (HMD) is worn by the user and can be configured to present various graphics, such as a view of a virtual scene, on a display screen of the HMD. The graphics presented on the screen of the head-mounted display can cover a large portion or even all of a user's field of view. Hence, a head-mounted display can provide a visually immersive experience to the user.

In order to enhance the immersive experience for a user at any given time, the HMD may be configured to just render game scene of a virtual game generated by a computer/computing device, for example, or live images from a real-world environment, or a combination of both the real-world environment and virtual game scene.

It is within this context that embodiments of the invention arise.

SUMMARY OF THE INVENTION

Embodiments of the present invention disclose methods, systems and computer readable media that are used for rendering an image of a user interacting in a physical space at a display screen of a head mounted display (HMD) while the user is viewing virtual content on the HMD. For example, the virtual content may include images from a virtual reality scene of a video game that the user, wearing the HMD, initiated for game play. While the user is interacting with the video game, an image of the user may be captured by one or more external cameras (e.g., in the form of "selfie" image). The image of the user can be displayed on the display screen of the HMD or shared with other users. The capture of the user's image may be in response to an input provided to or on the HMD by the user during game play. The input may include the user touching a surface or a button associated with the HMD or an input provided via a controller that is used to provide the input to the video game. In some implementations, the game play of the video may be paused prior to capturing the image of the user. The image captured is of the user interacting in the physical space while providing input to the video game that is providing content to the HMD. The user's interaction is part of the interaction data generated by the user. A computing device that is communicatively coupled to the HMD is configured to receive the image of the user and identify a specific portion of the virtual content to associate with the image of the user. In some implementations, the specific portion may be identified to correspond with the frame(s) that were being rendered at a time the image of the user was captured. As a result, the association is done by linking the image of the user to one or more frames identified in the specific portion of the virtual content. The linking allows the image of the user to be rendered on a display screen of the HMD along with the portion of the virtual content when the portion of the virtual content is viewed at a later time.

The embodiments provide ways to correlate the virtual reality (VR) scene to images of a user. The images of the user may show the user moving in a real-world environment while interacting with a portion of the VR scene. In some implementations, the image(s) of the user may be presented during or after rendering the VR scene. The image of the user capturing the user's interaction with the virtual content can be shown to the user, saved, and in some implementations, shared with other users in a social or gaming network. The user may control the specific interactions to capture by providing input on a user interface of the HMD, for example, at appropriate times during game play. The input to capture an image of the user, e.g., a selfie picture, can also be provided via a controller, via a gesture, a voice input, etc.

In one implementation, a method for presenting an image of a user interacting with a video game, is disclosed. The method includes providing images of a virtual reality (VR) scene of the video game for rendering on a display screen of a head mounted display (HMD). The images of the VR scene are generated in response to a request for game play of the video game received from a user wearing the HMD. A user input provided at a user interface on the HMD is received, during game play. In response to the user input, the game play of the video game is paused. An activation signal is generated to activate an image capturing device. The image capturing device is external to the HMD and is oriented toward the user wearing the HMD. The activation signal causes the image capturing device to capture an image of the user, wherein the image of the user is a "selfie" picture of the user interacting in the physical space at the time of the capture. The image of the user captured by the image capturing device is processed and transmitted to the HMD for rendering on the display screen of the HMD. In other embodiments, the captured images are simply saved to storage. The user can later view the images and decide to share, post, or comment about the images. In some implementation, the user may be provided with an option to associate the captured images to corresponding portions of the game play of the video game.

In another embodiment, a system for presenting an image of a user interacting with a video game, is disclosed. The system includes a computing device. The computing device, in turn, includes, among other modules, a memory, a game processor, an input analyzer and a signal generator. The memory is configured to store game code of a video game. The game processor is configured to execute an instance of the video game and generate video frames that include images of a virtual reality (VR) scene of the video game. The game processor is further configured to receive user interaction during game play of the video game. The user interaction is used to affect an outcome or simply drive interactivity of the video game. The game processor is additionally configured to pause the game play of the video game, in response to a user input received from an user interface of a head mounted display (HMD) that is communicatively connected to the computing device. The input analyzer is configured to receive the user input from the HMD during game play of the video game, analyze the user input and forward the analyzed user input for further processing. The signal generator is configured to generate an activation signal to activate an image capturing device that is communicatively coupled to the computing device, in response to the user input received from the HMD. The image capturing device, when activated, captures image of the user interacting in a physical space while the user is providing input to the video game, codes the image and forwards the coded image to the computing device that processes the image. The image may be saved for later viewing, sharing or posting to social websites or game sites.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 1A illustrates a simplified block diagram of a system that is used in providing an image of a user interacting in physical space for rendering on a head mounted display (HMD) during game play of a video game, in accordance with an embodiment of the present invention.

FIG. 1B illustrates a simplified block diagram of a system that is used to provide an image of a user for rendering on a HMD during game play of a video game, in an alternate embodiment of the invention.

DETAILED DESCRIPTION

Figure 2:
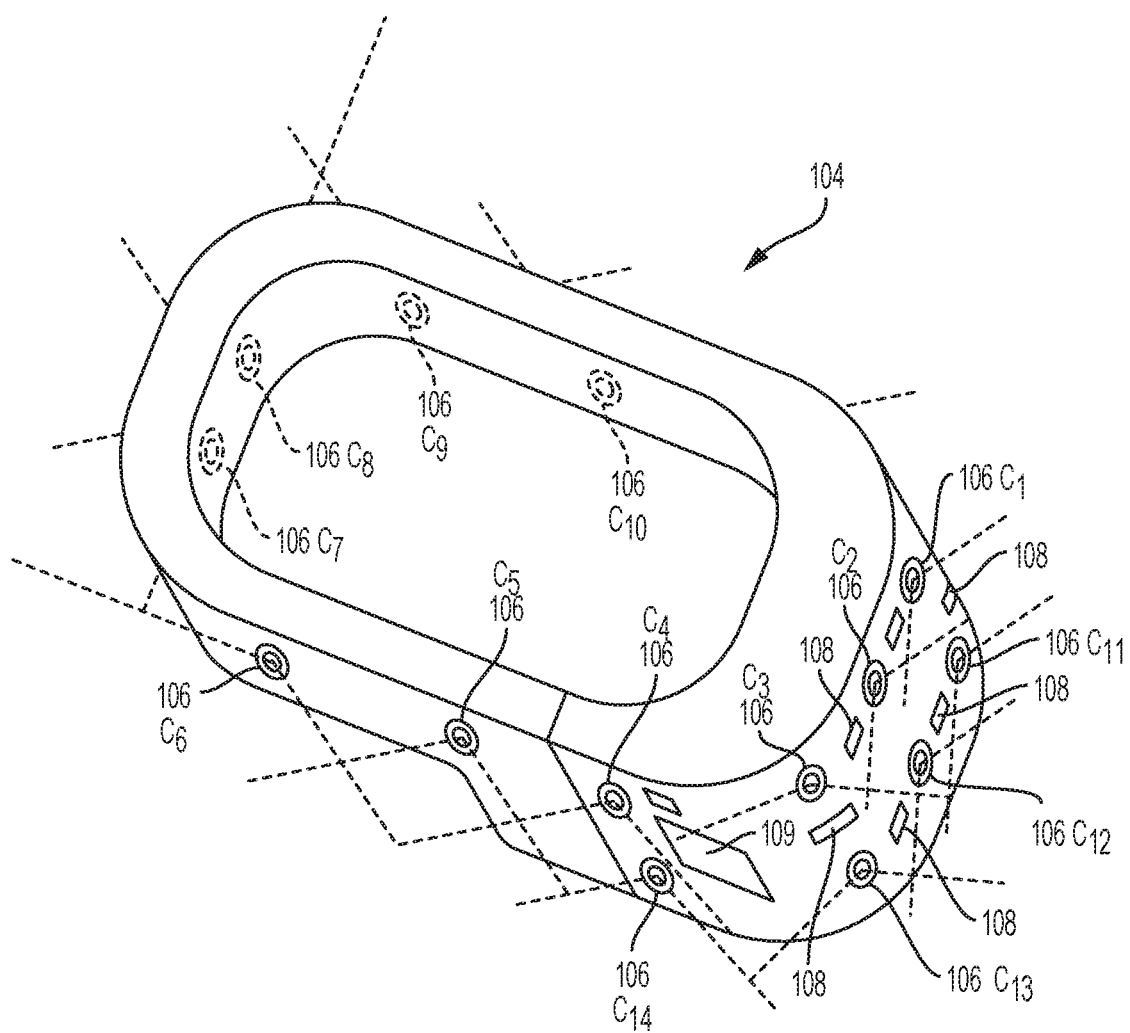
FIG. 2 illustrates a simplified block diagram of a HMD having a plurality of forward facing cameras mounted on an outside surface of the HMD to capture an image of the user during game play, in accordance to an embodiment of the invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various implementations, an image of a user interacting in a physical space may be captured while a user is immersed in virtual content that is currently rendering on a display screen of the HMD. In some implementations, the virtual content rendered on the HMD may be virtual reality (VR) scene from a video game that is provided in response to a game play request initiated by the user. User interaction during game play of the video game is used to affect an outcome or drive interactivity of the video game. A change in the outcome of the video game causes an update to the VR scene provided for rendering at the HMD. An image of the user interacting with the video game is captured during game play and can be presented on a display screen of a head mounted display (HMD) during the rendering of the VR scene. The image of the user (e.g., a selfie) is captured by an image capturing device that is external to the HMD. An input provided by the user may be used to activate the image capturing device to begin capturing the image of the user. For example, during rendering of the VR scene of the video game, a user may provide an input, such as a gesture input, a button press, a voice command, etc., at a user interface provided on the HMD or a controller, and this input is used to activate the image capturing device. The image capturing device, once activated, captures an image of the user interacting in a physical space while viewing the content on the display screen of the HMD. The captured image of the user is processed. In one implementation, the processed image may be associated with a currently rendering portion of game play and transmitted to the HMD for rendering on the display screen of the HMD, or shared or simply saved to storage for later retrieval.

In an alternate implementation, the computing device may process the image and link the image of the user to a portion of the VR scene, after conclusion of the game play of the video game. For example, when a video game is selected for game play, a computing device that is communicatively connected to the HMD executes an instance of the video game and provides game scene for the video game for rendering on the display screen of the HMD. The computing device may record the game play of the video game and store the recording in a local buffer during game play and transfer it to a game datastore after game play. In such implementations, when the user input for capturing an image of the user is detected at the HMD, the HMD sends a signal to an image capturing device to capture the image of the user as the user is interacting in the physical space and stores the image in a local buffer with a time code. Once the game play is over, the computing device retrieves the recorded game play for the video game, and links the image of the user to the identified portion. For instance, the image of the user may capture the user's reaction when the user wins a car race in the video game. The user's reaction may be captured in an image or in a video or audio format. As part of linking, the computing device may identify a video clip from the recorded game play of the video game (e.g., a portion of the recorded game play where the user wins the car race) that corresponds with the user interaction (e.g., the user's celebratory jump or wave) captured in the image of the user. The video clip may be identified using the time code associated with the image. The image of the user is then linked to a video frame within the video clip that corresponds with the user winning the race. In some implementations, the linking causes the image of the user to be rendered when the video clip is being rendered. In other implementations, the linking may cause the user's image to be retrieved when the video clip is shared with other users. The image of the user captures the user's action or reaction to a particular event within the video game and is presented at an appropriate time when the recorded game play is rendered. The image of the user may be rendered so as to provide different visual effects, such as bringing the image of the user into view while fading the VR scene out of view, presenting the image of the user in a first portion of the display screen while rendering the VR scene in a second portion, presenting the image of the user in a particular background color or highlight while rendering the VR scene in a different background color, bringing the image of the user gradually into focus, etc.

With the general understanding of the invention, specific embodiments will be described with reference to the various drawings. It should be noted that various embodiments described in the present disclosure may be practiced without some or all of the specific details described herein. In other instances, well known process operations have not been described in detail in order not to unnecessarily obscure various embodiments described in the present disclosure.

FIG. 1A illustrates an example configuration of a system used in the various implementations. The system includes a head mounted display (HMD) 104 that is worn on a head of a user 100 in a manner similar to glasses, goggles, or a helmet and is configured to display content, such as interactive content from a video game, etc., on a display screen for user viewing. The HMD has a small display optic, e.g., lens, glass, etc., in front of one or each eye of the user and the display screen is behind the display optic so that the content rendered on the display screen is viewed through the display optic. The HMD 104 provides a very immersive experience to the user by virtue of its provision of the display mechanisms (i.e., display optics, such as lens, glass, etc.,) in front and in close proximity to one or both eyes of the user. In the implementation where separate display optics are provided in front of both eyes of the user, both the eyes see one scene. Thus, the HMD 104 can provide display regions to one or both eyes of the user, which occupy large portions or even the entirety of the field of view of the user.

In one implementations, the HMD is communicatively connected to a computing device (simply referred herein onward as a "computer") 110. The connection between the HMD 104 and the computer 110 can be wired or wireless. The computer 110 can be any general or special purpose computer known in the art, including but not limited to, a gaming console, personal computer, laptop, tablet computer, mobile computing device, cellular phone, thin client, set-top box, media streaming device, etc. The computer 110, in some implementations, is configured to execute an instance of an interactive application, in response to a request from a user and provide audio and video content from the interactive application for rendering on a display screen of the HMD 104. The interactive application may be a multi-user game application that is played by multiple users or a single user game application played by a user. In some implementations, at least a portion of the interactive application is executing on the computing device 110. In such implementations, any remaining portion(s) of the interactive application may be executed on the HMD 104.

The HMD 104 includes a user input circuit that enables the user to interface with and provide input to the interactive application. For example, the user input circuit allows the user to provide input using the HMD (e.g., moving the HMD). In another example, the user input circuit may provide an input interface that allows a user to provide gesture input or audio input or button presses, touch pad input, etc. Various technologies may be employed to detect and interpret the user input provided at the input interface, input provided by movement of the HMD to determine position and movement of the user and the HMD that is communicatively coupled to the HMD. For example, the user input circuit of the HMD may include various types of inertial sensor circuits, such as accelerometers, gyroscopes, and magnetometers to interpret the movement of the HMD. In addition to the inertial sensor circuits, the user input circuit of the HMD, in some implementations, may include global position systems (GPS), compass, etc., to detect the position of the user, HMD, in relation to one or more reference points. In some implementations, the accelerometer is a 6-axis low latency accelerometer. In some implementations, the HMD can include one or more fixed reference objects (otherwise termed "marker elements") 108, e.g., light emitting diodes (LEDs), marker elements, such as colored points, light reflectors, etc., and the user input circuit may interpret the input provided by user action/interaction, movement of the HMD, etc., by interpreting the relative position of these fixed reference objects.

The system includes one or more image capturing devices 112 that are external to the HMD and are communicatively coupled to the computer 110 and/or the HMD 104. Image capturing device 112 can be configured to capture image of the physical space in which the user 100 is located. These captured images can be analyzed at the image capturing device 112 and/or at the computer and/or at the HMD to determine the location and movement of the user 100, and the HMD 104. For example, the images of the fixed reference objects on the HMD 104 are captured by the image capturing device(s) 112 (i.e., the digital cameras) and the position of the user and/or the HMD is determined by analyzing the relative position of the reference objects. Similarly, gesture actions and movement of the user are captured by the digital cameras and interpreted in a similar manner. In some implementations, the image capturing device is a video camera that includes a single Charge Coupled Device (CCD), an LED indicator, and hardware-based real-time data compression and encoding apparatus so that images captured may be compressed, and the compressed video data may be transmitted in an appropriate format, such as an intra-image based motion picture expert group (MPEG) standard format. The position and movement of the user, the HHC 102 and/or the HMD 104 can be determined through analysis of the images captured by the one or more image capturing devices.

The image capturing device(s) 112 may include one or more microphones to capture sound from the physical space. Sound captured by an array of microphones within the image capturing device(s) 112 may be processed to identify location of a sound source. As part of processing, sound from an identified location can be selectively included and remaining sounds that are not from the identified location may be selectively filtered out. The image capturing devices may include an IR camera, a depth camera, or combinations thereof, to provide stereoscopic set of cameras, and the images captured by these image capturing devices may be processed to provide a three-dimensional image of the physical space.

In some implementations, the system may also include a hand-held controller (HHC) 102 that can be operated by the user to provide input for the interactive application. The HHC 102 may include any of various features, such as buttons, inertial sensors, trackable LED lights, marker elements, touch screen, a joystick with input controls, directional pad, trigger, touchpad, and may have circuitry/logic to detect and interpret hand gestures, voice input or other types of input mechanisms for providing input to the interactive application. Furthermore, the HHC 102 may be a motion controller that enables the user to interface with and provide input to the interactive program by moving the controller.

In various implementations, instead of the HHC 102, hands of the user 100 may be used to provide gestures, e.g., hand gestures, finger gestures, etc., that may be interpreted by interactive application and/or the logic within the HMD 104. In some implementations, the user 100 may wear an interactive glove with built-in sensors to provide tactile feedback. The interactive glove acts as the HHC 102, when worn by a user, and provides input in the form of interactive gestures/actions to the interactive program and/or the HMD 104. Similar to the HHC 102, the interactive glove may include marker elements, such as LEDs, light reflectors, etc., to allow detection of various movements. The interactive glove is one form of wearable device that is used to provide input to the HMD 104 and/or the interactive program and that other forms of wearable clothing/device may also be engaged.

In alternate implementations, the computer 110 may be a thin client that is communicatively connected to a server, such as a cloud server 300, on a cloud system over a network 200. The cloud server 300 maintains and executes the interactive application, such as the video game, and provides content of the interactive application executing on the cloud system (e.g., cloud gaming system) to the computer 110 for onward transmission to the HMD 104 and/or the HHC 102. The computer 110 transmits inputs from the HMD 104, the HHC 102 and the camera 112, back to the cloud system, which processes the input to affect a state of the interactive application, such as game state of an executing video game. The output from the executing video game, including audio data, video data, haptic feedback data is transmitted to the computer 110. The computer 110 may process the data before transmitting the data to the relevant devices, or the computer may transmit the data directly to the relevant devices.

In some implementations, the HMD 104, the HHC 102, and the image capturing device 112 may themselves be networked devices that connect to the network 200 to communicate with the cloud server 300. For example, the computer 110 may be a local network device, such as a router, that does not otherwise perform interactive application processing, such as video game processing, but facilitates passage of network traffic. The connections to the network by the HMD 104, camera 112 and HHC 102, may be wired or wireless.

In some implementations, the computer 110 may be part of the cloud system and the HMD 104, the camera 112 and the HHC 102 communicate directly with the computer 110 on the cloud system via the network 200. In some implementations, the computer 110 may be a virtual machine that uses the resources of the cloud system to execute an instance of the interactive application and provide content for rendering on the HMD.

In some implementations, a portion of the interactive application may be executed by the computer 110 on the cloud system and the remaining portion of the interactive application is executed on the HMD 104. In such implementations, the HMD 104 includes a router (not shown) to communicate with the cloud server 300 of the cloud system, over the Internet 200. In some other implementations, a portion of the interactive application is executed on the computer 110 and the remaining portion of the interactive application is executed on the cloud system by a cloud server 300 (as shown by the dotted line in FIG. 1A). In such implementations, the state of the interactive application is synchronized between the computer 110 and the cloud server 300.

The HMD 104 may include one or more forward facing cameras 106 to capture images of gesture input provided by the user and/or images of physical space in which the user is interacting. The images captured by the forward facing cameras 106 may be processed within the HMD or forwarded to the computing device for further processing. In the implementation where the images are processed within the HMD 104, a processor within the HMD 104 analyzes the gesture input to determine whether an output of a video game is affected by the gesture input. Additionally, the processor within the HMD 104 may analyze image of the physical space in which the user is interacting to determine various image attributes. Some of the image attributes may include the type of physical space captured in the image, user's proximity to one or more objects, angle at which the image is captured, etc. These image attributes may be used to determine the objects, actions and scenes captured therein and may also be used to determine the relative position of the user, HMD in the physical space.

In one implementation, a digital camera 106 is located on a face plate of the HMD 104 facing forward. The digital camera 106 is used to capture a different perspective of the physical space in which the user is located. In other implementations, a plurality of digital cameras 106 may be disposed along a length of face plate and along a length of a headband of the HMD 104 to capture additional panoramic image capture of the physical space.

FIG. 2 illustrates one such implementation. The digital cameras 106 (*c*1-*c*15) are shown to be disposed along a length of the HMD and along a length of a headband of the HMD. Each of the digital cameras 106 (*c*1-*c*15) captures a portion of the physical space in the vicinity of the user. The digital cameras, in some implementations, are positioned such that the image captured by each digital camera has an overlapping portion with the images captured by the adjacent digital cameras. In some implementations, the digital camera may be a stereo camera, an IR camera, a single-lens camera, etc. The processor of the HMD and/or the processor of the computing device 110 processes the images captured by the digital cameras of the HMD. In some implementations, the processing of the images may include "stitching" the images by matching the overlapping portion of the images captured by each camera. Based on the orientation of the various digital cameras, the stitched image of the physical space, in one implementation, may offer a 360° panoramic view of the physical space in which the user is interacting.

In some implementations, the image captured by the forward facing digital camera 106 on the HMD 104 may be used along with image captured by the image capturing device 112 that is outside of the HMD 104 to generate a three-dimensional image of the physical space.

FIG. 1B illustrates an example configuration of a system in which both the image capturing device outside of the HMD and the forward facing cameras 106 disposed on the face plate of the HMD are engaged in capturing a physical space in which the user is present, in one implementation. In this implementation, the image capturing device 112 and/or the forward facing cameras disposed on the outside surface of the HMD 104 may track the various marker elements, reference points disposed on the respective devices, (e.g., HHC 102, HMD 104, and the image capturing device 112) and the processor of the HMD 104 or the computer 110 may determine the relative position and orientation of the HHC 102, the HMD 104 and the user 100 within the captured images of the physical space between the HMD and the image capturing device 112. The one or more forward facing cameras and the image capturing device act together as a set of stereo cameras and the images captured by the respective camera/device are used in generating a three-dimensional view of the physical space. As used herein, the processor of the HMD may be a microprocessor, a programmable logic device, an application specific integrated circuit (ASIC), or a combination thereof.

The network 200 within the system may be a local area network (LAN), a wide area network (WAN), or a combination thereof. Examples of the network 200 include the Internet, an Intranet, or a combination thereof. In some embodiments, the network 200 uses a transmission control protocol (TCP)/Internet Protocol (IP) or a user datagram protocol/IP (UDP/IP) to communicate media data via the network 200 between the game cloud and the HMD 104 or the HHC 102. The embodiments are not restricted to the TCP/IP or UDP/IP protocol but can also engage other forms of communication protocols for communicating media data via the network. In various embodiments, the network uses a combination of Ethernet and TCP/IP protocol to communicate media data via the network 200 between the game cloud and the HMD 104 or the HHC 102.

The HMD 104 and the computer 110 include a coder/decoder (codec) and a stream buffer. The stream buffer is used to store a stream of content data, which is generated upon execution of an interactive application, such as the game application. The content data includes virtual environment data, virtual game object data, etc. The virtual environment data is used to generate a virtual reality (VR) scene of the interactive application (e.g., video game) and the virtual game object data is used to generate one or more animate or inanimate game related content, e.g., virtual game characters, virtual game objects, virtual points, virtual prizes, game interface, etc. Examples of a VR scene include a virtual geographic region, e.g., a virtual city, a virtual road, a virtual lake, a virtual ocean, a virtual race track, a virtual arena, virtual stadium, etc. The video game is an example of the interactive application executed by one or more processors of the computer 110. In some implementations where a portion of the interactive application is being executed on a cloud system, one or more cloud servers of the cloud system may execute an instance of the interactive application. The codec uses a compressor/decompressor to code/decode content data using lossy compression, lossless compression, etc., when transmitting the content or upon receiving the content.

The HMD 104 is used to access an operating system (OS) that is executed by the processor of the HMD 104. For example, selection and activation of a button in the HMD 104 enables the processor of the HMD 104 to execute the OS. Similarly, the HHC 102 may be used to access an OS that is executed by the processor of the HHC 102. A button on the HHC 102 may be used to have the processor of the HHC 102 to execute the OS.

In some implementations, the OS allows the HMD 104 to directly communicate with the computer 110. User authentication may be required to allow the HMD to access the computer 110, in accordance to access protocol established between the HMD 104 and the computer 110. A built-in router (not shown) within the HMD 104 is used to interact with the computer 110 to exchange content data of an interactive application, such as a video game, selected using input from the HMD 104. In such implementations, the communication between the computer 110 and the HMD 104 may follow a wired or wireless communication protocol depending on the type of communication that is established between the HMD 104 and the computer 110. Along similar lines, the OS of the HHC 102 allows the HHC 102 to access the computer 110, in accordance to access protocol established between the HHC 102 and the computer 110, wherein the access protocol may follow a wireless communication protocol.

Figure 3:
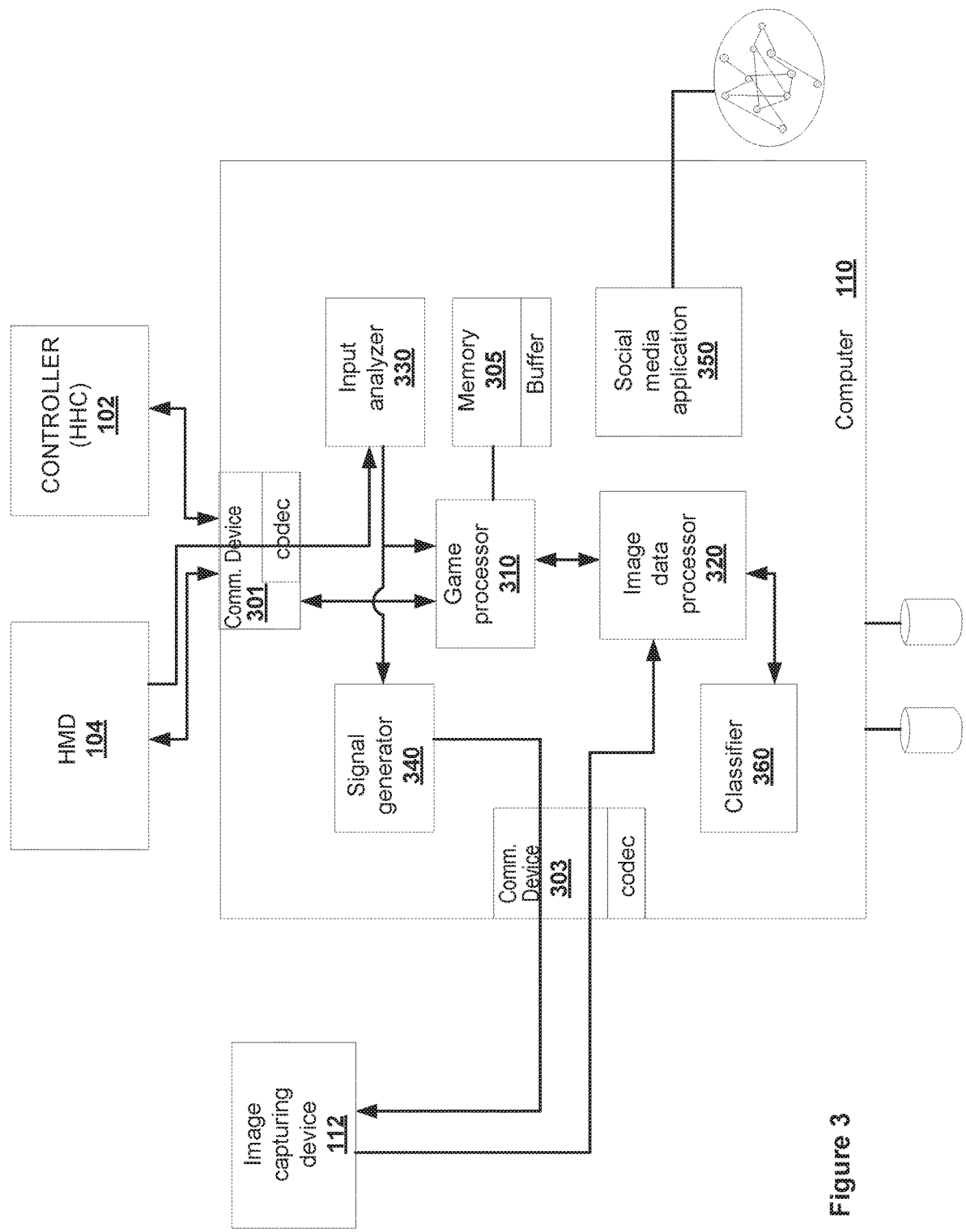
FIG. 3 illustrates a simplified block diagram of different modules of a computing device that are used to send signal to capture an image of a user and to present the image during game play, in accordance to an embodiment of the invention.

FIG. 3 illustrates example architecture of the computer 110 that is used to provide access to the video game application and to provide an image of the user interacting in physical space captured during game play of the video game, in one implementation. In this implementation, the HMD 104 is provided access to the video game available on the computer 110. As such, there is no need for network access as the computer 110 is local to the HMD 104. In some implementations, where the computer 110 is a network computer, such as a cloud server on a cloud system, network access needs to be initiated and authenticated prior to providing access to the game application executing on the cloud server.

A game processor 310 of the computer 110 receives a request from the HMD 104 to access a game application. The request includes at least a user identifier, user authentication data, and a game identifier. The request is received via a communication device 301, in accordance to communication protocol established between the HMD 104 and the computer 110. The request is processed by the game processor 310 by authenticating the user using the authentication information, then identifying the game application and executing an instance of the game application stored in memory 305. Although game processor 310 has been referenced herein, it should be noted that the embodiments are not restricted to a game processor but can be any other processor that is capable of executing an instance of an interactive application and generate content data. Game data generated from execution of the video game is forwarded by the game processor 310 via the communication device 301 to the HMD for rendering. The game processor 310 may process the game data prior to forwarding. As part of processing, different components (audio data, video data, haptic feedback data, etc.) of the game data may be identified and each component may be processed separately. For example, the game processor 310 may engage an image data processor 320 to process the video portion of the game data prior to forwarding the game data to the HMD via the communication device 301. The processed video data is forwarded to the HMD 104 for rendering. The game processor 310 may process the audio data, haptic feedback data in a similar fashion prior to forwarding the respective data to the HMD 104 or HHC 102 for rendering.

The audio and video portion of the game data may be processed further by the communication device 301 prior to forwarding to appropriate devices at the HMD and/or HHC. The communication device 301 may use a codec to code (e.g., compress, etc.) digital data stream containing the audio and video data from game play prior to forwarding the stream of coded media data to the HMD 104. Similarly, the communication device 301 may code haptic feedback data and forward it to the HHC 102 for rendering.

The HMD 104 receives the digital data stream of the coded media data via the built-in router, and a processor of the HMD 104 processes the digital data stream. The processing may include de-packetizing, decoding, etc., the data stream, identifying the audio and video component, and forwarding the different components of data from the data stream to corresponding devices of the HMD. The video data may be used to render the content as game scenes of the game on a display screen of the HMD 104. In some embodiments, the display screen of the HMD 104 is a high performance screen to reduce blur when the HMD 104 is moved rapidly. In one implementation, the display screen is a Liquid Crystal Display (LCD) screen. The audio data may be directed to speakers of the HMD.

In response to the game data, the user 100 performs one or more head and/or eye motions, e.g., head tilting, winking, gazing, shifting gaze, staring, etc., or hand gestures, and each head or eye or hand motion triggers the user input circuit of the HMD to generate an input, which may be used as user interaction input provided during game play to influence an outcome of the game. In the implementations described with reference to FIG. 3, the game application executes on the computer 110 and the communication between the game application and the HMD 104 is through the communication device 301 of the computer 110 and a built-in router of the HMD 104.

In response to receiving the user interaction input, the game application executing on the computer 110 interprets the user interaction input, updates a game state of the game and generates additional media data that is packetized by the game processor to generate a stream of additional media data. The additional media data may include modifications to game play, including modifications to virtual game object, e.g., computer-generated object, etc., that is used for updating the VR scene rendered on the HMD. The stream of additional media data may be stored in a stream buffer at the computer 110, coded by the codec within the first communication device 301, and sent as a stream of coded additional media data via the communication device 301 to the HMD 104. The HMD 104 receives the stream of coded additional media data, de-packetizes the stream, and decodes the coded additional media data to provide the additional media data to a microcontroller of the HMD 104 for further processing. A microcontroller of the HMD 104 changes a display of a game scene that is rendered on the screen of the HMD based on the additional media data.

User interaction inputs may be provided through the HMD 104 and/or the HHC 102. For example, the user 100 may provide interaction inputs using input mechanisms provided in the HMD 104. Alternately, the user 100 may perform hand motions, e.g., press of a button, movement of a joystick, hand gesture, finger gesture, a combination thereof, etc., using the HHC and such user interaction input provided at the HHC 102 generates input data that is converted into input signals by a communications circuit of the HHC 102. The converted input signals are communicated by the communications circuit of the HHC 102, (e.g., a transceiver, a transmit/receive circuitry, etc.) to a communications circuit of the HMD 104. The HHC includes hand-held controllers, joysticks, motion controllers, wearable articles of clothing, wearable devices, etc. The input signals originating from the HHC 102 and the HMD 104 are converted from an analog form to a digital form at the HMD 104, packetized, coded by the HMD 104 and sent as coded input data via the built-in router and the first communication device 301 to the game application executed by the game processor 310. The HMD 104 may engage a communications circuit available within including a transceiver, a transmit/receive circuitry, a network interface controller, etc., to convert, packetize and code the input signals. In a number of embodiments, the user 100 performs the hand motions and provides user input that is interpreted by the HMD as input signals. The input signals are used to change a location and/or orientation of the virtual object rendered at the HMD.

In some embodiments, the game application executing at the computer 110 maps interaction input data that is generated by the HMD with interaction input data that is generated at the HHC (e.g., based on the hand motions) to determine whether to change a state of the video game that is providing the game scene for rendering on the HMD 104. For example, when an input from the HMD and an input generated at the HHC 102, such as a press of a button on the HHC 102, are both received, the game application determines to change a state of a game. When one or the other input is missing, the game application determines not to change a state of a game.

The codec within the first communication device 301 of the computer 110 decodes, (e.g., decompresses) the stream of coded input data received from the HMD 104 and the decoded input data is buffered in a stream buffer for de-packetizing. The game processor de-packetizes the stream of decoded input data and sends the input data to the game application. Upon receiving the input data, the game application interprets the input data and generates next media data that is packetized to generate a stream of next media data. The stream of next media data is stored in the stream buffer, coded by the codec of the first communication device 301, and sent as a stream of coded next media data to the HMD 104. The HMD 104 receives the stream of coded next media data, de-packetizes the stream, and decodes the coded next media data to provide the next media data. The microcontroller of the HMD 104 changes the VR scene rendered on the screen of the HMD based on the next media data. For example, a look, position, and/or orientation of a virtual game object is changed when rendered on the screen of the HMD 104.

It should be noted that the input data generated at the HHC and/or the HMD changes a state of the game. In some embodiments, a display of a game scene is referred to herein as a portion of interactivity associated with the game application.

In various embodiments, instead of communicating the interaction input data that is generated based on the hand motions from the HHC 102 via the HMD 104, the input data is communicated directly from the HHC 102 to the first communication device 301. The input data that is generated at the HHC 102 is communicated by the HHC 102 in a manner similar to the communication by the HMD 104. For example, the input data that is generated based on the hand motions from the HHC 106 is coded and packetized by the HHC 102 and sent as a stream of coded input data via a built-in router to the first communication device 301.

During game play, the game processor 310 may generate a recording of the game play of the user for the video game. In some implementations, the recording may be stored in a local buffer defined in a cache memory during the game play and transferred to a game database after the game play of the video game. The recording of the game play may be used to generate game clips for viewing by the user and sharing with other users. The game processor 310 may engage a social media application 350 to access one or more social media graphs 350a of the user in order to identify social contacts of the user. The user may then share one or more game clips of game play with one or more social contacts of the user identified from the user's social graph. In some implementation, the user may share the game clips of game play with other users in a game network. These users may not be social contacts or socially associated with the user but may have played one or more video games with the user.

As a game scene is being displayed on the display screen of the HMD 104, a user input, such as a gesture input, may be detected at an input interface (not shown) provided at the HMD 104. The gesture input provided at the input interface on the HMD 104 is different from the other user input provided at the HMD and/or the HHC. The input interface may be a touch interface that is rendered on a side of the HMD and is configured to receive the gesture input in the form of touch input from the user. In response to detecting a gesture input at the input interface, the HMD 104 sends a signal to the computer 110 via the built-in router of the HMD 104 and the communication device 301. The game processor 310 receives the signal, and engages an input analyzer 330 to analyze the gesture input defined in the signal. The input analyzer 330 processes the signal to identify the input attributes contained in the signal. Some of the input attributes that may be identified include type of gesture input (e.g., a forward or a backward swipe gesture, button press, single tap, double tap, etc.), direction or location of gesture input, speed or intensity of the swipe gesture, etc. The input analyzer 330 forwards the input attributes of the gesture input to the game processor 310. Based on the input attributes identified, the game processor 310 may or may not forward the input attributes of the user input to a signal generator 340. For example, when the gesture input identifies a gesture that is below a pre-defined threshold, the game processor 310 may ignore the gesture input. If, however, the gesture is above the pre-defined threshold, the signal generator 340 triggers a signal, such as a device signal, that is transmitted via a second communication device 303 to activate an image capturing device 112. In addition to the device signal, the signal generator 340 generates a second signal and forwards it to the game processor 310. The second signal may be generated based on the input attributes detected from the gesture input provided at the input interface of the HMD. For example, if the gesture input is a forward swipe gesture, the second signal conveys a pause signal to pause game play of the video game executed by the game processor 310. On the other hand, if the gesture input is a backward swipe gesture, the second signal conveys a un-pause signal that includes instructions to resume game play of the video game. In another example, a first gesture is interpreted as a pause signal and a subsequent gesture is interpreted as an un-pause signal. In response to the pause signal, the game processor 310 may identify and store an identifier for the current location of the video game from where the game play needs to be resumed. When an un-pause signal is initiated, the game processor 310 may be able to retrieve the current location identifier, re-wind the video game a pre-defined length of frames or a pre-defined length of time (e.g., 2 seconds, 3 seconds, etc.,) from the location identified by the current location identifier, and restart the video game for game play from the re-wound location, such that the user will be able to resume game play from a re-wound section of the game.

The image capturing device 112, upon activation, captures one or more images of a physical space in which the user is interacting at a time when the input signal was initiated at the touch input surface of the HMD. In some embodiments, the image capturing device is a digital camera 112. In other embodiments, the image capturing device is a video camera. Examples of the physical space include real-world environment, such as a room from where the user 100 is accessing the game, a geographical region in which the user 100 is located, real-world objects around the user 100, etc. Examples of a geographical region include a park, a road, a street, a lake, a city, a landmark, etc. Examples of a real-world object include a bus stand, a coffee shop, a store, an office, a vehicle, a room, a desk, a table, a chair, a ball, etc.

The real-world environment data along with one or more images of the user interacting in the real-world environment captured by the activated image capturing device 112, in one embodiment, is forwarded to the computer 110 via a second communication device 303. In some implementations, the image capturing device 112 may also capture audio data of the real-world environment. In some implementations, the audio data and images of the real-world environment data including the user interaction in the real-world environment is processed, packetized and coded by a processor of the image capturing device 112 prior to forwarding to the computer 110 via the second communication device 303.

The second communication device 303 at the computer 110 forwards the images and audio data received from the image capturing device 112 to the image data processor 320. The image data processor 320 is used to identify the various objects, scenes and actions captured in the image. In some embodiments, the image data processor 320 may engage a classifier module 360 that classifies real world objects to detect and identify the objects, actions and scenes captured in the image by the image capturing device 112. In one example, the classifier module 360 uses a database and an update engine to categorize the identified objects, actions and scenes captured in the images. Using a classifier module 360, it is possible to enable fast identification of real world objects. In some embodiments, the update engine can update its database by accessing other databases, either locally or over the network, such as the Internet. The update engine may enable, for example, comparison of images to identify objects to databases of images, which can quickly render information about the objects. The information can include data that generally identifies the object, e.g., "a chair" or can also include more detailed data (e.g., metadata).

The detailed data, for instance, can identify the object as associated with a trademark, e.g., CocaCola™, can identify a shape, a color, three-dimensional shapes, bar codes (2D and 3D), sounds, and combinations of two or more thereof. In some embodiments, the classifier module 360 can identify individual objects, such as a coffee table or lamp situated within the virtual reality interactive space (e.g., the "real-world" in which the user is wearing an HMD, as captured by one or more cameras). As a further example, the classifier module 360 may be able to identify a floor and a wall and the points at which the two meet.

The classifier can also identify and categorize dimensions, relative dimensions, user generated content (UGC), user tag data, user comments, social media feeds, user reviews, etc. In other embodiments, classifier module 360 can be trained using deep learning neural networks. Such networks may rely on data provided by specific data, as well as data received from many users. As noted, classifier module may be preferably optimized to identify objects that may be captured by cameras and/or other sensors. Processing using one or more classifier modules, therefore, optimizes the speed and efficiency of object recognition and uses of such information. The images along with the identified objects, actions and scenes are processed by the image data processor 320. In some implementations, the image data processor 320 associates the image(s) of the physical space to a corresponding portion of a video recording of game play.

The image data processor 320 may identify the user input characteristics provided at the input interface of the HMD to determine a time frame of the user input. The image data processor may then request and receive the video recording of the game play from the game processor 310. The image data processor 320 then identifies a portion of the video recording that corresponds with the time frame when the user input was received and generates a video clip for the portion. The video clip includes a plurality of video frames of a game scene captured within. The image data processor 320 then associates the image, video and/or audio data captured by the image capturing device to appropriate portion of the video clip by linking the image, video and/or audio data to a specific video frame that corresponds with the time frame when the user input is received. It should be noted that linking the image(s) to the video clip using a time line is one way of establishing the association and that other ways of associating the images to the video clip may be engaged.

In some implementation, in addition to associating the images to appropriate video frames, the image capturing device may process the images of the physical space and the video frames from the video clip to include some rendering characteristics, so that when they are presented on the HMD, the images and the video frames are rendered in accordance to the rendering characteristics. For example, the images from the physical space and the video frames from the video clip may be formatted such that the images from the physical space may be gradually brought into view while the video frames from the video clip are gradually faded out of view, when rendered on the display screen of the HMD. In another example, the formatting of the images and the video frames may include rendering the image(s) of the user captured in the physical space in a first portion of the display screen and the video frames from the video clip in a second portion, wherein the first portion and the second portion may be defined by splitting the area defined in the display screen vertically, horizontally, diagonally, etc. In some implementations, the rendering characteristics may be used to adjust an orientation of the image of the user provided for rendering on the display screen. For example, the image of the user may be adjusted by flipping along a horizontal axis so as to cause image of the user to switch from a mirror view orientation to a reverse mirror view orientation. In alternate implementations, the image of the user may be adjusted by flipping along a vertical axis. In some implementations, the image may be adjusted to provide some special effects so that when they are rendered on the screen, the image can be easily distinguished. In such implementations, the video frames from the video clip are rendered alongside the image of the user.

In alternate implementations, the images and the video frames may be formatted based on detected gaze direction of the user wearing the HMD. For example, the gaze direction of the user may be tracked using one or more gaze detection cameras that are disposed inside of the HMD and directed toward the user's eyes. When it is detected that the gaze direction of the user is directed toward a pre-defined area on the display screen of the HMD, the image(s) of the user in the physical space and the video frames from the video clip are formatted such that the image(s) of the user is presented in the portion of the display screen corresponding to the user's gaze direction while the remaining portion of the display screen continues to render the video frames from the VR scene of the video game.

In some implementations, the image(s) of the user need not have to be associated with the video frames from the VR scene, but instead be rendered alongside the VR scene in real-time. In alternate implementations, where the image(s) of the user is associated with the video frames from the VR scene, the association may be used when sharing the video clip with other users, such as social contacts of the user or contacts from a game network. For example, the user input at the input interface may include a request to capture the image of the user at a time when the user crosses a finish line in a virtual car racing game and the image capturing device may capture the user's action or expression, such as victory dance or victory wave or victory jump or the surprised expression, etc., as the user crosses the finish line. The captured image of the user may be rendered alongside the VR scene of the game in real time and/or may also be associated with a portion of the recorded game play so as to share the image of the user with other users. In some implementation, the image may be associated using a tag, wherein the tag identifies the time code within the recorded game play when the image is to be rendered. The image of the user acts as a "selfie" image taken during game play of the video game and allows the user to share the selfie image with other users either independent of the game play content or along with a video clip capturing the instance of game play for which the selfie image was captured.

The video clip with the associated image of the user interacting in the physical space may be stored along with the video recording in a game database so that it can be retrieved in response to a request for sharing received from the user.

Figure 4:
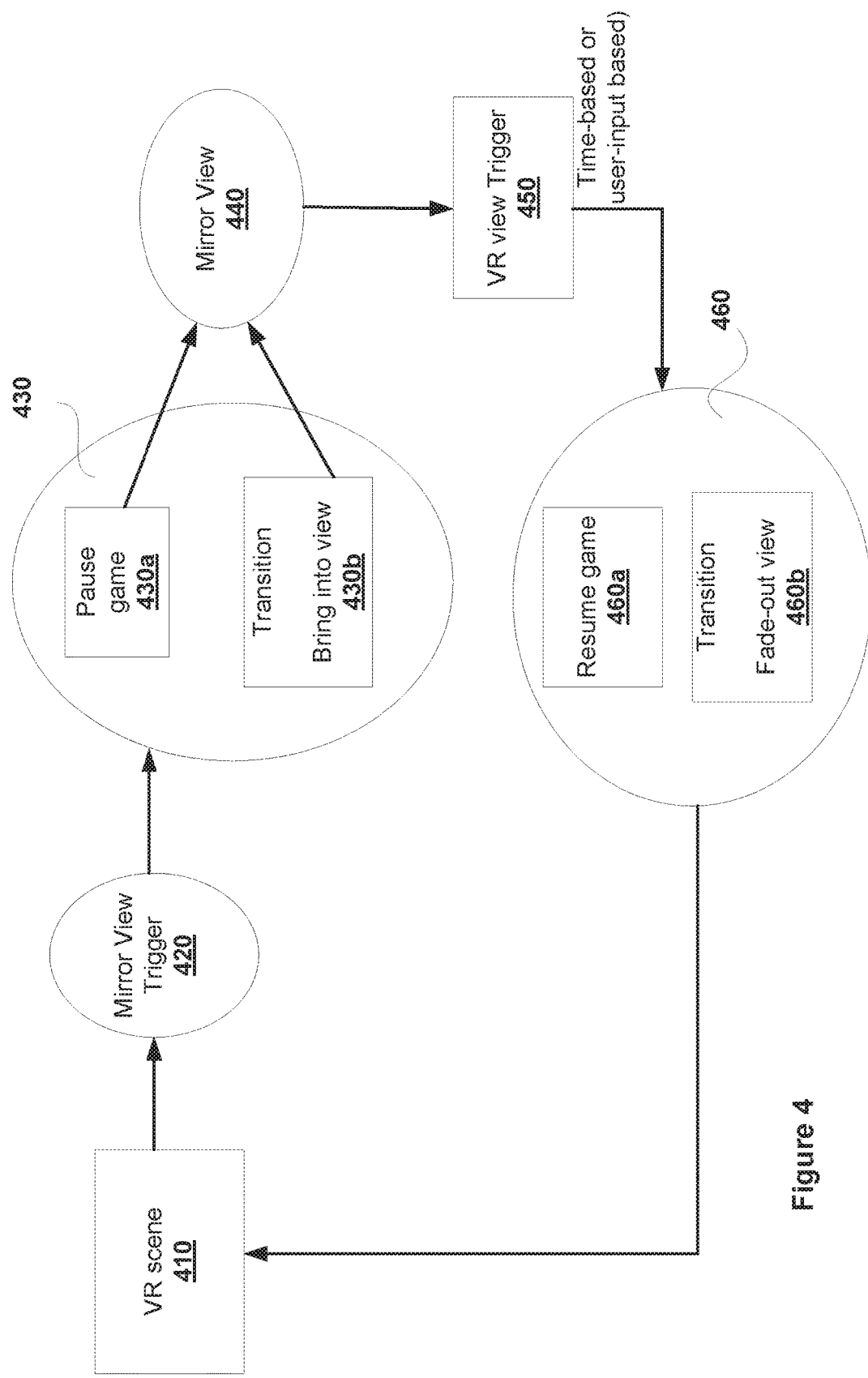
FIG. 4 illustrates a representative transition process at a HMD during rendition of an image of a user captured during game play, in accordance to an embodiment of the invention.

FIG. 4 illustrates an example data flow for transitioning a display screen of a HMD from a virtual reality scene to an image view, in response to an input initiated by a user during game play, in accordance to one implementation. The display screen of the HMD may be currently rendering virtual reality (VR) scene from a game play of a video game (operation 410) and the user wearing the HMD may be immersed in the VR scene. During rendering of the VR scene, a user input (e.g., a gesture action, such as a forward swipe, a directional swipe, a tap action, a button selection, a combination of button selections, etc.) is detected at a user interface of the HMD. The user interface may be a touch interface or an interface with buttons or any other interface that can receive user input. The user input is analyzed and when it is determined that the user input includes characteristics that are sufficient to cause a transition in content, a request (operation 420) is triggered to cause such transition. In response to the request triggered by the user input, a signal is generated to (a) cause the game processor to pause the game play (operation 430*a*) of the video game, and (b) to transition (operation 430*b*) the content provided for rendering on the display screen from the VR scene to the image of the user. In some implementations, instead of transitioning the entire display screen, the signal may cause the image of the user to be rendered alongside the VR scene. To effectuate the transitioning, for example, the game processor identifies the image of the user captured by the image capturing device at a time the user input was initiated at the HMD, and associates one or more rendering characteristics to the image and to the VR scene content currently rendering on the display screen, so that the image of the user can be rendered on the display screen of the HMD.

The transition causes the user's image to be rendered (operation 440) on the display screen of the HMD in accordance to rendering characteristics defined for the image of the user. In some implementations, the rendering characteristics may define special rendering effects to be implemented during transition of content rendered on the display screen, and in other implementations, the rendering characteristics may define an area of the display screen where the image of the user is to be rendered.

In some implementations, the transition may be effectuated in response to detecting a trend in user behavior or action instead of an explicit action at the input interface on the HMD. The user's actions (e.g., gaze direction, length of time of the user's action, etc.) may be tracked or monitored using one or more cameras/sensors. During monitoring, when it is determined that the user's gaze direction coincides with a pre-defined area on the display screen of the HMD and/or the length of the user's gaze in that direction or in any particular direction meets or exceeds a pre-defined threshold, the transition may be effectuated.

Upon transitioning the display screen, triggering of a second signal (operation 450) may be detected. The second signal may be a time-based trigger or a user-generated trigger. For example, in the time-based trigger, the second signal may be automatically generated by the computer 110 after a pre-defined period of time has passed since the display screen was transitioned to rendering the user's image. In the case of user-generated trigger, a subsequent signal may be detected to have been initiated by the user at the input interface of the HMD. In either case, the second signal is used to transition the display screen from rendering the user image back to rendering VR scene (operation 460). Similar to adjusting the content provided for rendering on the display screen from VR scene to the user image in response to an initial trigger request, the second signal causes the transition of content rendered on the display screen from the user image to the VR scene of the video game. In response to receiving the second signal, a resume signal may be initiated to cause resumption of game play of the video game (460*a*) and a transition signal may be initiated to transition the display screen of the HMD (460*b*). The resume signal is serviced by the game processor. As part of servicing, the game processor resumes the paused game play and forwards the game content from the resumed game play to the HMD for rendering the VR scene, while at the same time sending a signal to cease forwarding the user image content. A signal may also be forwarded to the image data processor to format the game content before forwarding it to the HMD for rendering. The resumption of the game play causes the display screen of the HMD to transition from rendering the user image to rendering the VR scene of the video game (410) in accordance to the display characteristics.

In some implementations, the image capturing device may be a video camera and the image captured is a video of the user interacting in the physical space. In such implementations, the video content capturing the user interaction may be rendered on the display screen of the HMD instead of the VR scene of the video game. In some implementations where the game play of the video game is recorded, the video content of the user interaction may be associated with a portion of the recorded video game that corresponds with a time when the user input at the input interface was initiated. The portion of the recorded video game may identify a video clip and the video content of the user interaction may be associated with the video clip. The video clip and the associated video content capturing the user interaction may be stored for the user and retrieved when the user wishes to share with other users.

Figure 5A:
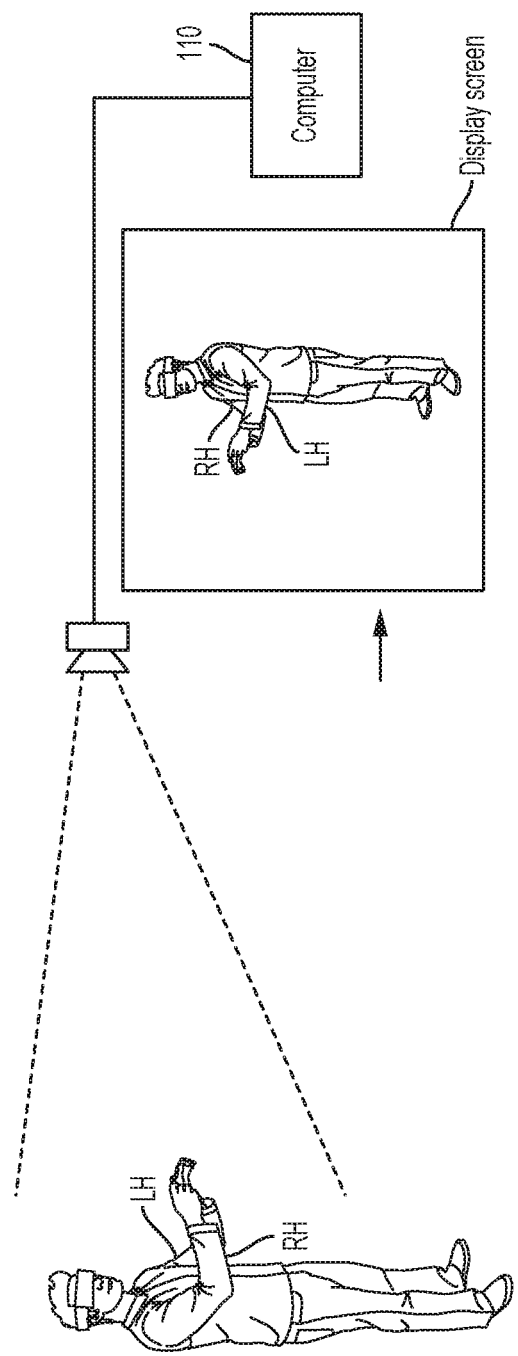
FIG. 5A illustrates an image of a user as captured by an image capturing device and rendered on a display screen of the HMD, in accordance to an embodiment of the invention.
Figure 5B:
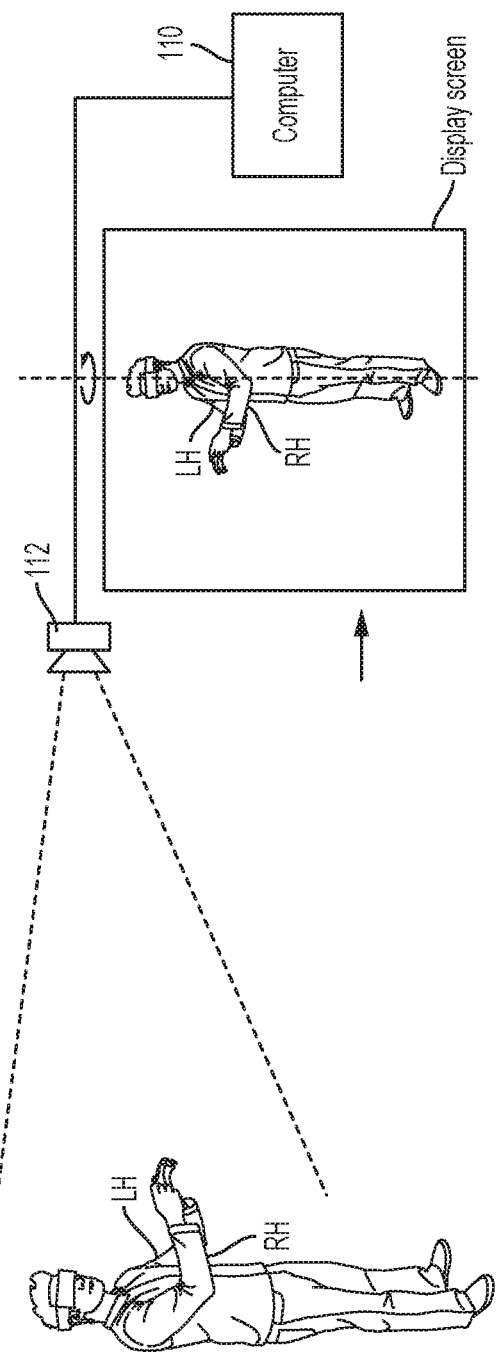
FIG. 5B illustrates the image of a user flipped along a Y axis as rendered on the display screen of the HMD, in accordance to an embodiment of the invention.

FIGS. 5A and 5B illustrate example views of a display screen of the HMD rendering an image of the user adjusted for different orientation, in some implementations. In FIG. 5A, the image of the user is rendered so as to reflect a mirror-view orientation, with the right hand of the user corresponding with the left side of the image and vice versa. In FIG. 5B, the image of the user captured by the image capturing device is adjusted to cause the image of the user to be rendered in a reverse mirror-view orientation. In the illustration of FIG. 5B, the image of the user is adjusted by flipping the image vertically along a Y-axis so that the right hand of the user corresponds with the right side of the image and the left hand of the user corresponding with the left side of the image.

Figure 6:
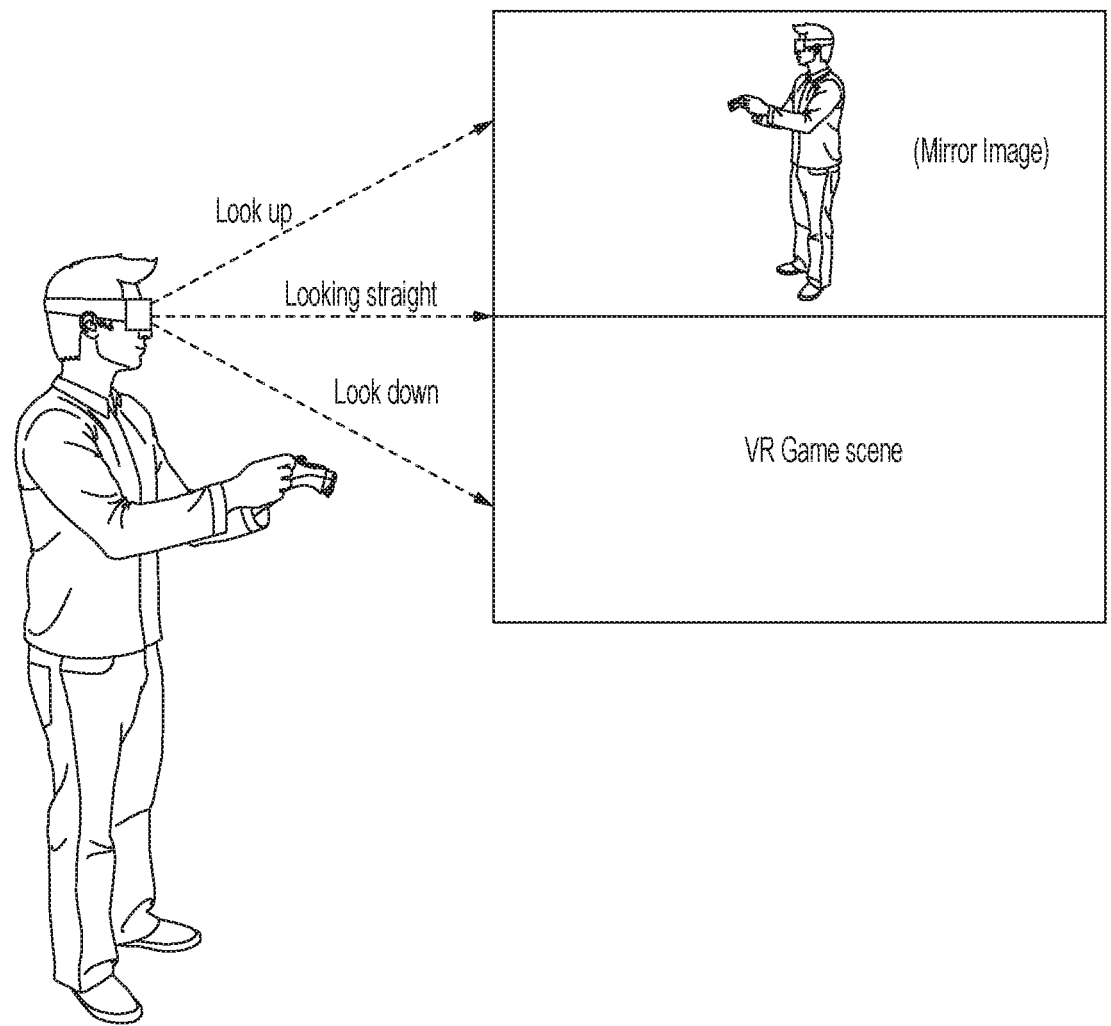
FIG. 6 illustrates a view of a display screen of a HMD that renders the image of the user alongside a virtual reality content, in accordance to an embodiment of the invention.

FIG. 6 illustrates another example view of a display screen of the HMD of the user rendering content of the VR scene and the image of the user in accordance to rendering characteristics defined for the respective content, in one implementation. The image of the user may be captured and rendered by tracking gaze direction of the user. In some implementations, every time the user looks up, a length of the user's gaze in that direction is determined. When the length exceeds a predefined period of time, a signal is generated to activate the image capturing device, so that an image of the user may be captured at the time of detecting the user's gaze direction. In other implementations, every time the user is seen looking up, the signal may be generated to activate the image capturing device so as to capture the image of the user. The captured image is processed to define rendering characteristics. The rendering characteristics, for example, may split the rendering area on the display screen such that a first portion is defined for rendering the image of the user and a second portion is defined for rendering the VR scene from the game play of the video game. In the illustration of FIG. 6, the screen area is split horizontally with the top portion defined for rendering the user's image and the bottom portion for rendering the VR scene of the game. The horizontal split is just one example and other ways of splitting the screen area of the HMD may also be considered.

The above embodiments and/or implementations were defined in relation to the HMD communicating directly with the computer that is local to the HMD 104, through wired or wireless communication connection. In other implementations, the OS of the HMD 104 allows the HMD 104 to directly communicate with the computer 110 disposed on a cloud system by accessing the network 200. For example, a user may select a network access application that is executed by the processor on top of the OS of the HMD 104, using a network access icon, a network access symbol, etc. The network access application provides a list of networks from which to select a network. User selection of the network 200 from the list allows the HMD 104 to access the network 200. User authentication may be required to allow the HMD to access the network 200, in accordance to network access protocol. Access to the network 200 is enabled for the user upon selection and successful user authentication (if needed) (e.g., username, password authentication).

A built-in router (not shown) within the HMD 104 uses the network 200 to interact with the game cloud to exchange game data. In these embodiments, the communication between the network 200 and the HMD 104 follows a wireless communication protocol. Along similar lines, the HHC 102 may independently gain access to the network 200 by selecting the network using network access application and the communication between the HHC 102 and the network follows a wireless communication protocol.

Once the network 200 is accessed, the OS allows the HMD 104 to access the game application in a manner similar to the selection of the network. For example, when the user 100 selects a game access application executed by the processor of the HMD 104 on top of the OS through a game access icon, a game access symbol, etc., the game access application requests access to the game application via the network 200. Content data for the game application is forwarded to the processor of the HMD 104 for displaying to the user 100.

In some implementations, instead of accessing the game application/program, the user 100 may access the game application via a web page. In such implementations, the user may request access to a web page upon accessing the network 200 and the web page allows the user 100 to access the game application. For example, the user 100 selects a web browser application via the user input circuit or via the HHC 102 to access a web page. In one implementation, the user input circuit is part of the HMD and includes a processor and one or more communication devices. The one or more communication devices are configured to receive and validate the user input provided through various interfaces and access devices, such as the HHC, wearable devices, etc., and the processor of the HMD is configured to process the user input, such as selection of the web page, received from the HMD or the communication devices communicatively linked to the HMD and forward the processed user input to the computer 110 that is local or on the game cloud for servicing. The computer 110 services the request to access the web page by generating the web page with plurality of games available for the user account and forwarding to the HMD 104 for rendering. Upon accessing the web page, the user 100 may select a game displayed on the web page for game play or may access the game using a link provided within. In response to the selection, an instance of the game is executed on the game cloud or computer 110 and game scene from the game is provided for rendering on a display screen of the HMD. In some embodiments, user authentication may be required before providing access to the web page to play the game that is displayed when the game application is executed on the game cloud. The username and/or the password is authenticated before the user 100 is provided access to the game.

When the computer 110 is on the game cloud, the HMD 104 processes, packetizes and codes the user input and forwards the coded user input to a codec in the game cloud through the built-in router of the HMD 104 and the network 200. In some embodiments, in addition to the user interaction input, the real-world environment data captured by image capturing devices communicatively connected to the HMD 104, may also be packetized and coded by the HMD 104 and sent as a stream of coded environment data via the built-in router of the HMD 104, the network 200 to the codec in the game cloud.

Upon receiving the user interaction input and/or the real-world environment data, the game application generates additional media data that is processed, packetized and sent as a stream of coded additional media data via the network 200 to the HMD 104. The HMD 104 receives the stream of coded additional media data, de-packetizes the stream, and decodes the coded additional media data to provide the additional media data to a microcontroller of the HMD 104. The microcontroller of the HMD 104 changes a display of a game scene that is rendered on the screen of the HMD based on the additional media data.

In response to the media data and as part of game play, user interaction inputs are provided through the HMD 104 and/or the HHC 102 and such inputs are converted from an analog form to a digital form by the communications circuit of the HMD 104, packetized, coded by the HMD 104 and sent via the network 200 to the codec. The interaction inputs are processed by the computer 110 on the cloud system to affect a state of the video game. Content data in the form of media data, additional media data, the next data, etc., are streamlined directly to a wireless access card (WAC) of the HMD 104 by the codec of the game cloud via the network 200 and the built-in router. Moreover, in these embodiments, data, e.g., input data, real-world environment data, etc., is streamed directly by the WAC of the HMD 104 to the codec of the game cloud via the built-in router and the network 200. The WAC in conjunction with the built-in router of the HMD is able to transmit the streaming media data and the input data to and from the HMD.

In some embodiments, a router (not shown) is provided between the HMD 104 and the network 200. The router may also act as an interface between the HHC 102 and the network 200. In this embodiment, the WAC of the HMD 104 will interface with the router to communicate with the network 200. In some embodiments, the HMD 104 is coupled to the router via a wireless connection, e.g., a Bluetooth connection or a Wi-Fi connection, etc. Moreover, the HHC 102 is coupled to the router via a wireless connection. In some embodiments, the router is coupled to the network 200 via a wired connection. When a router is provided, a stream of coded data is sent from the HMD 104 or the HHC 102 to the router. The router, in turn, routes (e.g., directs, etc.) the stream of coded data to a path in the network 200 to facilitate sending the stream to the codec on the game cloud. The router uses the IP address of the codec to route the stream of coded data to the codec. In some embodiments, the router determines a network path of the network 200 based on network traffic factor, e.g., packet traffic on the network path, congestion on the network path, etc.

The router receives a stream of coded data from the game cloud via the network 200 and routes the stream of coded data to the HMD 104. For example, the router routes the stream of coded data received from the game cloud via the network 200 to the HMD 104 based on the IP address of the HMD 104. In some embodiments that use the systems described with reference to FIG. 1A, the game execution occurs mostly on the game cloud. In some embodiments, some part of the game may execute on the HMD 104 while the remaining portions may execute on the game cloud.

In some embodiments, a list of wireless networks is rendered on the screen of the HMD 104 for user selection. Alternately, in some other embodiments, a list of wireless networks is presented on a display screen associated with the computer 110. For example, when the computer 110 is a mobile phone, the mobile phone includes a display screen for displaying the list of wireless networks. As another example, when the computer 110 is coupled to a television display screen, the list of wireless networks is displayed on the television display screen. In these embodiments, the list of wireless networks is accessed when the processor of the computer 110 executes the wireless access application stored within a memory device of the computer 110 to access the network 200. A processor of the computer 110 executes the wireless access application when the user 100 generates input data via the HMD 104 or the HHC 102 by performing the head motions and/or hand motions. Input data generated based on the head motions and/or the hand motions are sent from the communications circuit of the HMD 104 or the HHC 102 to the computer 110. When the processor of the computer 110 receives the input data, the wireless access application is executed to generate the list of wireless networks for user selection to access the network 200.

The computer 110, in some embodiments, includes a network interface controller (NIC) that requests a portion of the game application from the game cloud. Examples of a NIC include a network interface card and a network adapter. The portion of the game application is coded by the codec and streamed via the network 200 to the NIC of the computer 110. The processor of the computer 110 executes the portion of the game application to generate media data, which is sent from a communications circuit of the computer 110, to the HMD 104 for display on the display screen of the HMD 104. A communications circuit of the HMD 104 receives the media data from the computer 110 and sends the media data to the microcontroller of the HMD 104 for processing and displaying the media data, including game scene, on the display screen of the HMD 104.

Moreover, the communications circuit of the computer 110 receives input data generated based on the head motions from the HMD 104 and/or the hand motions from the HHC 102 or actions (e.g., gesture actions) performed at the HMD 104 and sends the interaction input data to the processor. In response to the input data, the processor executes the portion of the game application that is stored within the computer 110 to generate the next media data, which is sent to the communications circuit of the HMD 104 to change the game play, including changing/updating virtual game objects and/or virtual environment of a game displayed by execution of the game application. When the game objects, e.g., real world objects, virtual game objects, etc., and/or virtual environment changes, a game state of the game displayed by execution of the game application changes.

In some implementations, the computer 110 may be local to the HMD and may connect to one or more cloud servers on a game cloud. In such implementations, media data, additional media data, next media data, etc., are initially sent from the codec on the cloud server via the network 200 and the router to the HMD 104 until a portion of the game application is downloaded to the computer 110 from the game cloud. For example, initially, the user 100 uses the game access application to access a video game. When the video game is accessed, the media data, the additional media data, the next media data, etc., is sent from the codec via the network 200 and the router to the HMD 104 for display on the display screen of the HMD 104. During the time of access of the media data from the game cloud for display on the HMD 104, the NIC of the computer 110 downloads a portion of the game application from the game cloud via the network 200 and the router.

In a number of embodiments, a portion of input data generated based on the head motions and/or hand motions and/or a portion of the real-world environment data is sent from the HMD 104 via the router and the network 200 to the codec of the game cloud while the remaining portion of the input data and/or the remaining portion of the real-world environment data is sent from the communications circuit of the HMD 104 to the communications circuit of the computer 110.

In various embodiments, a portion of input data generated at HHC 102 is sent by the communications circuit of the HHC 102 via the router 152 and the network 200 to the codec of the game cloud and the remaining portion of the input data is sent from the communications circuit of the HHC 102 to the communications circuit of the computer 110 through the HMD 104. In response, media data is returned by the cloud server of the game cloud via the network and the router to the HMD 104 for rendering on the display screen.

In several embodiments, media data, the additional media data, the next media data, etc., that is generated by executing the game application and sent from the codec of the game cloud to the HMD 104 has a higher amount of graphics than media data that is generated by the game processor of the computer 110. In some of the embodiments, the computer 110 is bypassed when the media data is directly sent from the codec of the game cloud via the network 200 to the HMD 104.

In some embodiments, the computer 110 requests a portion of the game application from the game cloud via the NIC and in response, the portion of the game application coded by the codec is streamed via the network 200 to the NIC of the computer 110. The remaining portion of the game application is executed on the cloud server. In some embodiments, the portion that is downloaded to the computer 110 may be the entire game. The media data, additional media data and next media data generated by the computer 110 is sent from a first communications circuit, a network interface controller, etc., of the computer 110, to the HMD 104 for display on the display screen of the HMD 104.

In some implementations, one or more external cameras mounted on an outside face of the HMD 104 may be used to capture a physical space of the real-world environment from the vicinity of the user wearing the HMD. The images captured by the external cameras of the HMD are transmitted by the communications circuit of the HMD 104.

In some implementations, the images of the physical space captured by the external camera are stored locally within the HMD and transmitted to the computer for further processing, when a gesture input is detected at an input interface of the HMD. The computer may use the images captured by the external cameras along with images of the physical space captured by the image capturing devices 112 to generate a three-dimensional image of the physical space in which the user is interacting. In response to the gesture input, the image of the user interacting in this three-dimensional rendition of the physical space may be extracted and forwarded to the HMD for rendering along with image rendering characteristics.

In various embodiments, the external camera may be a video camera. In several embodiments, the external camera may be a digital camera or a regular camera. In some implementations, the external cameras together with the image capturing devices 112 act as stereo cameras capturing depth of the physical space disposed between the external cameras and the image capturing devices 112.

In another embodiment, the external camera may be an infrared (IR) camera that is used to analyze infrared light provided on the HMD. The infrared light is not visible to the human eye but can be easily detected by the infrared camera. The HMD may include infrared lights to avoid distraction in the appearance of the HMD. In some environments (e.g., low light or bright light), it may be easier to track infrared light than other types of lights for detecting location, shape and or features in the HMD. The infrared (IR) cameras provide enhanced imaging and thermal imaging of a tracking object, such as the HMD. The IR cameras may also be used as gaze detection cameras to detect user's gaze direction.

The external cameras capture the images of the physical space in relation to various reference points or elements within the physical space, on the image capturing devices, etc. In addition, the visual tracking may be combined with other types of tracking, such as inertial motion tracking, dead reckoning, ultrasound communication between the HMD and the computer 110, etc. For more information regarding method for following a marked object, reference may be made to U.S. Patent Application Publication No. 2012-0072119, filed on Aug. 15, 2011 and published on Mar. 22, 2012, and U.S. Patent Application Publication No. 2010-0105475, filed on Oct. 27, 2008 and published on Apr. 29, 2010, both of which are herein incorporated by reference. In some embodiments, the external cameras on the HMD may include one or more pairs of stereo camera, one or more infrared cameras and/or one or more regular camera or combinations thereof.

The HMD may also be equipped with one or more internal cameras (e.g., gaze detection cameras, etc.) mounted on the inside to capture images related to the user's gaze and feed the images to a communication module in the HMD to provide user specific data to the HMD. For example, the internal camera(s) may be used to identify a user wearing the HMD, which can be used to obtain user profile of the user. Accordingly, the internal cameras may be configured to engage retinal scanning technique and/or iris scanning technique to scan the user's retina or iris and use the data from the scanning to generate at least one biometric identity of the user. The user's biometric identity may be part of the user's profile. The internal cameras may also include a gaze detection camera that are equipped with gaze detector algorithm to detect the direction of the user's gaze and to adjust the image data rendered on a screen of the HMD based on the detection. In some embodiments, the internal cameras are IR cameras. The gaze detection technology may also be used to authenticate a user. For example, the user may be asked to follow an object rendered on the screen or track a randomly generated letter, object or pattern (for e.g., a circle, a triangle, a rectangle, etc.) that is rendered on the screen. In some embodiments, verbal or textual commands may be provided for a user to track a letter, an object or pattern on the screen and the user authenticated by using the gaze detection technology. The authentication of a user may be used to allow access to a user account, to a game, to certain parts or levels of a game, etc.

The display screen of the HMD may be disposed in front of one or each eye. The display screen(s) are miniature screens that include cathode ray tubes (CRTs), liquid crystal displays (LCDs), liquid crystal on silicon (LCos) or organic light emitting diodes (OLEDs), to name a few. Images are projected by the lens of the HMD onto the display screens. Adjustment may be made to the lens or the display screens and such adjustments affect the images that are rendered on the display screens of the HMD.

For example, the internal cameras 109 detect and track the user's eye movement and gaze. The internal cameras 109 may be used to determine the user's gaze direction for a period of time (for e.g., when the user is looking at a particular object or point in the images rendered on the display screen, for some period of time), detect a gaze pattern over a period of time (for e.g., when a user follows an object, traces a pattern, etc.), and/or detect changes in gaze directions (for e.g., back-and-forth movement of the eyes, rolling of the eyes—which may be a sign of the user experiencing dizziness or fatigue—especially in a high intensity game, etc.). The HMD's internal cameras communicate with the outside mounted cameras of the HMD and with the observation cameras to determine if data provided for rendering on the screen of the HMD needs to be adjusted, in response to detected eye movement or gaze or based on triggered events occurring within the game or in the environment in the immediate vicinity of the user wearing the HMD. The HMD's gaze detection cameras may also work with the image capturing devices 112 mounted outside of the HMD to adjust the images rendered on the display screen of the HMD. Such adjustments may include adjusting the images from the virtual reality scene and images of the user interacting in the physical space when rendering on the display screen of the HMD, in accordance to rendering attributes defined for these images. Such adjustments allow the user to view their own selfie image captured while the user was interacting with the video game. Video clips of game play may be generated for the video game by identifying specific portions of the game play, and the selfie image captured during game play may be associated with the corresponding portion(s). This association may be stored and retrieved for sharing with other users, when a share request is initiated by the user. The video clip that is shared includes the user's game play recorded for the portion of the video game and the selfie image captured during game play of the portion.

Although various embodiments have been described in relation to a gaming environment, it is envisioned that the interfacing can also take place during interactive communication with a computer system. The computer system can be a general computer, with a graphical user interface that allows user 100 to present and make gestures in space, that control icons, entry, selection, text, and other commands.

Figure 7A:
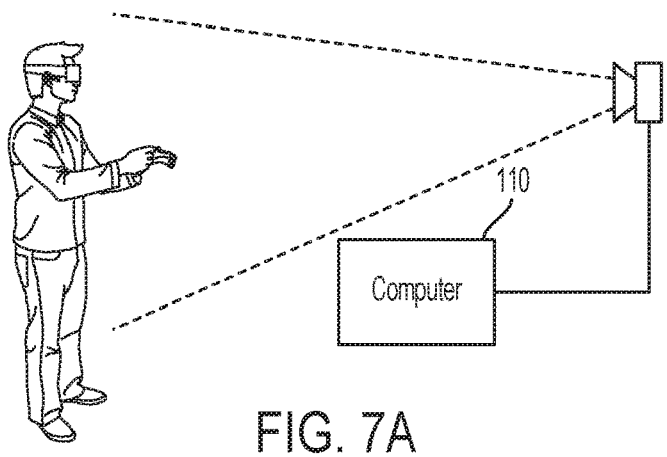
FIGS. 7A-7C illustrate a process of associating an image of a user captured during game play with an appropriate game scene of game play, in accordance to an embodiment of the invention.
Figure 7B:
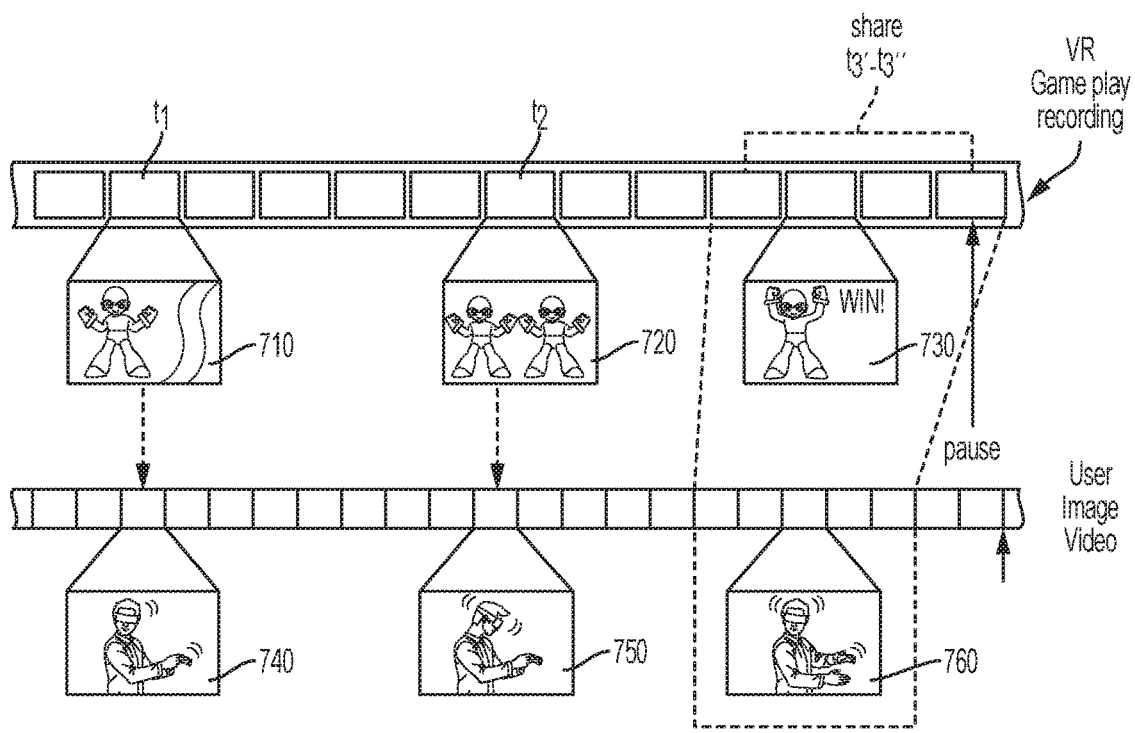
Figure 7C:
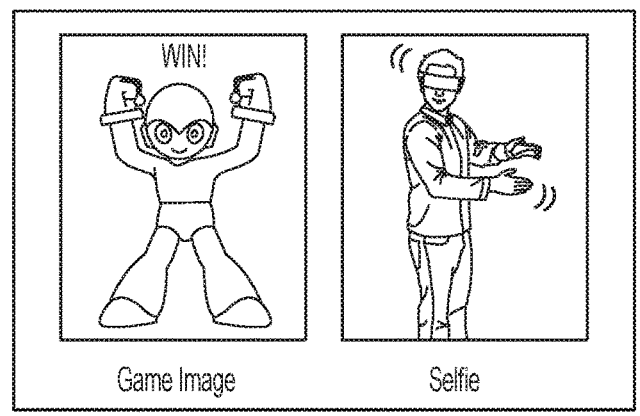

FIGS. 7A-7C illustrate a process of associating an image of a user captured during game play, with an appropriate game scene of game play, in one implementation. FIG. 7A illustrates an image capturing device, such as a camera, that captures one or more images of the user interacting in a physical space defined in a real-world environment, while the user is interacting with the video game during game play. The images may be captured at different times during game play and correspond to different portions of the video game.

Each of the images of the user captured during game play may represent the user interacting with a particular portion of the video game.

FIG. 7B illustrates the various images of the user captured by the image capturing device during game play that correspond with different portions of the video game. Each of the captured images is associated with a corresponding portion of the game play by identifying a specific video frame in a recording of the game play that correspond with the captured image and linking the captured image to the video frame. The video frame corresponding to the image of the user may be identified, in some implementations, using a timeline. For example, image 740 corresponds to video frame 710 recorded at time t1 of the game play. Similarly, user's image 750 corresponds to video frame 720 recorded at time t2 of game play. At time t3 of game play the user may have won a level or a race in the video game. The user's winning action may be captured in image 760. In some implementations, the image of the user may be captured as a video that covers a plurality of frames. For example, the video capturing the user's action/reaction to winning the game/level is captured in the set of frames represented by 760 in FIG. 7B, which corresponds to video frames recorded during a time frame that encompasses time t3'-t3". Once the image frames of recorded game play are identified for the different images of the user captured by the image capturing device, each of the images are linked to the corresponding identified image frames. Thus, in FIG. 7B, image frame 740 is linked to video frame 710 of game play. Similarly, image frame 750 is linked to video frame 720 and so on. Image frame(s) 760 is linked to video frame(s) represented by 730. When the image frame is a video frame that includes more than one image frame, the image frames may be associated with a corresponding set of video frames of the recorded game play for the video game. In FIG. 7B, the image frames 760 (i.e., video) capturing the user's reaction to winning the game/level may be linked to any one of the plurality of video frames 730 that correspond with the winning VR scene captured in the recorded game play.

FIG. 7C illustrates a view of the display screen rendering the VR scene where the user wins the game/level in the video game. The linking allows the user's image to be rendered alongside the VR scene. The user's image is a selfie image that captures the user's reaction at a certain point of time during game play (i.e., time when the user wins the game) and this image was captured based on the user input (e.g., gesture input) provided at the input interface on the HMD. The linking of the selfie image to the video recording of the user winning the game/level allows the user to share his achievement and his reaction to the achievement in game play, with other users, thereby allowing the user to provide a personal touch to the game play experience. The various embodiments also allows the other users to experience the user's reaction to the different scenes of game play in a manner that makes it appear that they are witnessing the user's game play in real-time. Other advantages may be realized by ones skilled in the art.

Figure 8:
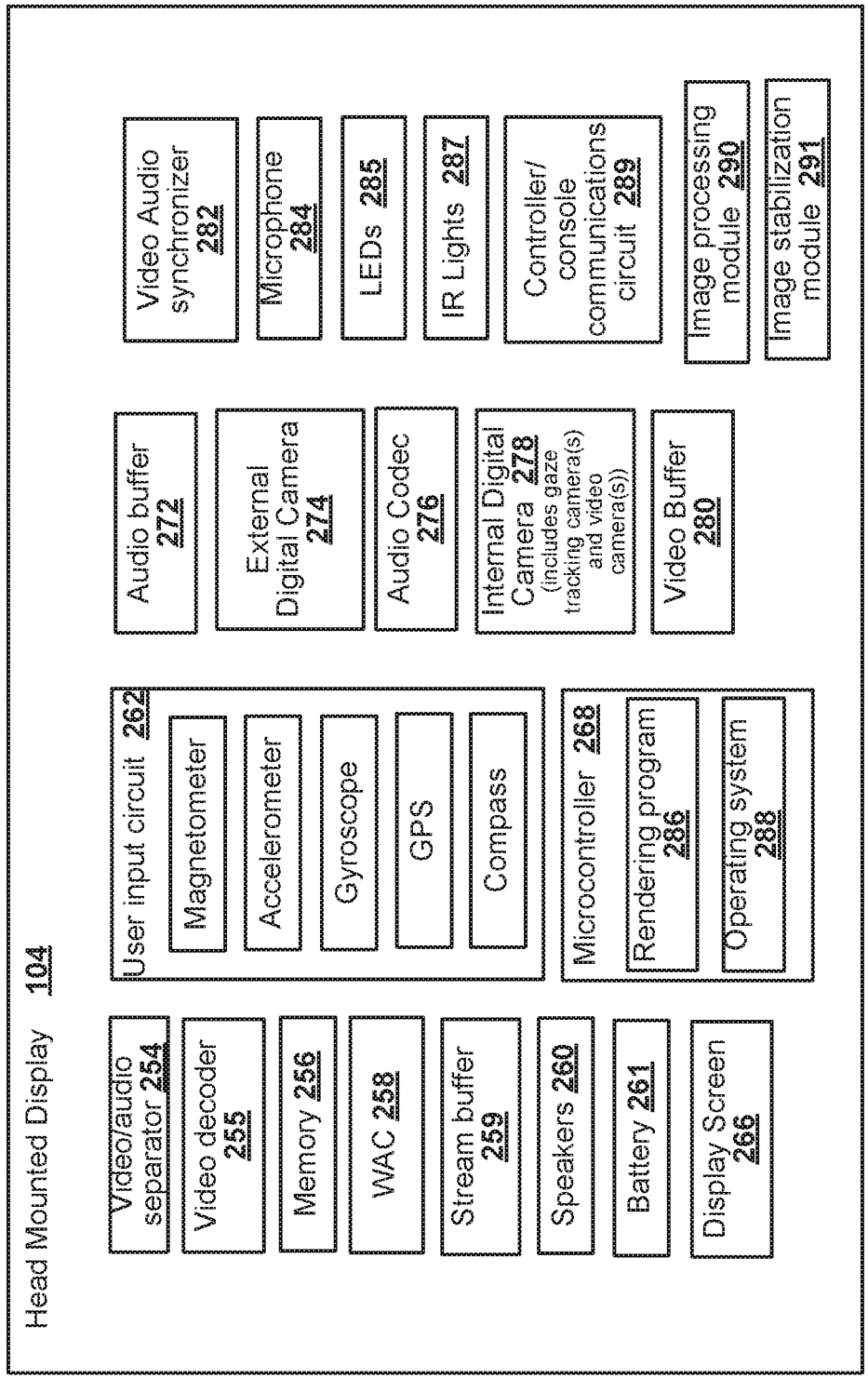
FIG. 8 illustrates an example communication architecture of a head mounted display used to render an image of a user interacting in a physical space during game play, in one embodiment of the invention.

FIG. 8 is a block diagram of a communication architecture of an HMD 104. The HMD 104 includes some exemplary control modules or sensors, such as a video audio separator 254, a video decoder 255, a memory device 256, a WAC 258, a stream buffer 259, one or more speakers 260, a battery 261, a user input circuit 262, a display screen 266, a microcontroller 268, an audio buffer 272, an observation digital camera 274, an external digital camera 275, an audio codec 276, an internal digital camera 278, a video buffer 280, a video audio synchronizer 282, a microphone 284, LEDs 285 and IR lights 287, a controller/computer communications circuit 289. The LEDs 285 and IR lights 287 represent the marker elements that are used to track the position of the HMD.

In a number of embodiments, the speakers 260 form an audio circuit. In various embodiments, the audio codec 276, the audio buffer 272, and/or the speakers 260 form an audio circuit. In various embodiments, the microcontroller 268 is part of a display circuit that controls images rendered on a display screen. Examples of a display screen 266 include an LED screen, a liquid crystal display (LCD) screen, a liquid crystal on silicon (LCoS) screen, an organic LED (OLED) screen, a plasma screen, etc. An example of the external digital camera includes an eye camera, such as Playstation Eye® manufactured by Sony Computer Entertainment, Inc.

The microcontroller 268 stores a rendering program 286 and an operating system 288. The rendering program 286 and the operating system 288 are stored in a memory device of the microcontroller 286 and executed by a microprocessor of the microcontroller 268. An example of microcontroller 268 includes a low cost microcontroller that includes a driver, e.g., an LCD driver, that generates a signal to detect elements (for e.g., LCDs, etc.), to provide media data, for displaying on the display screen 266. Another example of the microcontroller includes a GPU and a memory device.

In some embodiments, the memory device of the microcontroller is other than a flash memory or a random access memory (RAM). For example, memory device of the microcontroller is a buffer. In various embodiments, memory device of the microcontroller is a flash memory or a RAM. Examples of the user input circuit 262 include a gyroscope, a magnetometer, and an accelerometer. In some embodiments, the user input circuit 262 also includes a global position system (GPS), compass or any location tracking devices. An example of the WAC 258 includes a NIC. In some embodiments, the WAC 258 is referred to herein as a communications circuit.

A stream of coded media data is received into the stream buffer 259 from the network 200 or the router 152. It should be noted that when the router 152 is coupled to the computer 172, data received from the computer 172 is stored in a buffer (not shown) of the HMD 250 or in the memory device 256 instead of being stored in the stream buffer 259.

The WAC 258 accesses the stream of coded media data from the stream buffer 259 received from the computer or the codec 112 and de-packetizes the stream. The WAC 258 also includes a decoder to decode the coded media data.

In embodiments in which the stream of coded media data is received by the computer 172 via the router 152, the NIC 174 of the computer 172 de-packetizes and decodes the stream of coded media data to generate decoded data, which is stored in the buffer (not shown) of the HMD 250.

The decoded data is accessed by the video audio separator 254 from the WAC 258 or from the buffer (not shown). The video audio separator 254 separates audio data within the decoded data from video data.

The video audio separator 254 sends the audio data to the audio buffer 272 and the video data to the video buffer 280. The video decoder 255 decodes, e.g., the video data and/or changes to the video data from a digital form to an analog form to generate analog video signals. The video audio synchronizer 282 synchronizes the video data stored in the video buffer 280 with the audio data stored in the audio buffer 272. For example, the video audio synchronizer 282 uses a time of playback of the video data and the audio data to synchronize the video data with the audio data.

The audio codec 276 converts the synchronized audio data from a digital format into an analog format to generate audio signals and the audio signals are played back by the speakers 260 to generate sound. The microcontroller 268 executes the rendering program 286 to display a game on the display screen 266 based on the analog video signals that are generated by the video decoder 255. In some embodiments, the game displayed on the display screen 266 is displayed synchronous with the playback of the audio signals.

Moreover, the user 100 speaks into the microphone 284, which converts sound signals to electrical signals, e.g., audio signals. The audio codec 276 converts the audio signals from an analog format to a digital format to generate audio data, which is stored in the audio buffer 272. The audio data stored in the audio buffer 272 is an example of input data generated based on a sound of the user 100. The audio data may also include other audio signals generated at the HMD or detected by the speakers in the HMD. The audio data is accessed by the WAC 258 from the audio buffer 272 to send via the network 200 to the codec 112 of the game cloud. For example, the WAC 258 packetizes and codes the audio data accessed from the audio buffer 272 to send via the network 200 to the codec 112.

In some embodiments, the audio data is accessed by the WAC 258 from the audio buffer 272 to send via the router 152 and the network 200 to the codec 112 of the game cloud. For example, the WAC 258 packetizes and codes the audio data accessed from the audio buffer 272 to send via the router 152 and the network 200 to the codec 112.

The internal digital camera 278 captures one or more images of the eye motions of the user 100 to generate image data, which is an example of input data generated at the HMD. based on the head actions and/or eye movements. Similarly, the observation digital camera 274 and/or the external digital camera 275 mounted on the HMD captures one or more images of then hand of the user 100, and/or of the markers located on the HMD 250 and/or on the HHC/ glove/hand of the user 100, head motions of the user wearing the HMD, to generate image data, which is an example of input data that is generated based on the hand/head motions. The image data captured by the digital cameras 274, 275 and 278 is stored in the video buffer 280.

In some embodiments, the image data captured by the digital cameras 274, 275 and 278 is stored in a buffer of the HMD 250 and the buffer is other than the video buffer 280. In various embodiments, the image data captured by the digital cameras 274, 275 and 278 is decoded by the video decoder 255 and sent to the microcontroller 268 for display of images on the display screen 266.

The image data captured by the digital cameras 274, 275 and 278 is accessed by the WAC (wireless access card) 258 from the video buffer 280 to send via the network 200 (FIGS. 1A-1C) to the codec 112 of the game cloud. For example, the WAC 258 packetizes and codes the image data accessed from the video buffer 280 to send via the network 200 to the codec 112.

In some embodiments, the video data is accessed by the WAC 258 from the video buffer 280 to send via the router 152 and the network 200 to the codec 112 of the game cloud. For example, the WAC 258 packetizes and codes the video data accessed from the video buffer 280 to send via the router 152 and/or the network 200 to the codec 112.

The controller/console communications circuit 289 receives media data from the computer 172 for storage in the buffer (not shown). Moreover, the controller/console communications circuit 289 receives input signals from the HHC 102, converts the input signals from an analog form to a digital form to generate input data, which is accessed by the WAC 258 to send via the network 200 to the codec 112 of the game cloud. For example, the WAC 258 packetizes and codes the input data accessed from the controller/console communications circuit 289 to send via the network 200 to the codec 112.

In some embodiments, the input data is accessed by the WAC 258 from the controller/console communications circuit 289 to send via the router 152 and the network 200 to the codec 112 of the game cloud. For example, the WAC 258 packetizes and codes the video data accessed from the video buffer 280 to send via the router 152 and the network 200 to the codec 112.

It should be noted that instead of the controller/console communications circuit 289, two separate communications circuits may be used, one for communicating, e.g., receiving, sending, etc., data with the computer 172 and another for communicating data with the HHC 102.

In a number of embodiments, the decoder is located outside the WAC 258. In various embodiments, the stream buffer 259 is located within the WAC 258.

In some embodiments, the HMD 104 excludes the observation digital camera 274. In several embodiments, the HMD 104 includes any number of microcontrollers, any number of buffers, and/or any number of memory devices.

In various embodiments, the HMD 104 includes one or more batteries 261 that provide power to components, e.g., the video audio separator 254, the memory device 256, the wireless access card 258, the stream buffer 259, the one or more speakers 260, the user input circuit 262, the display screen 266 the microcontroller 268, the audio buffer 272, the external digital camera 274, the audio codec 276, the internal digital camera 278, the video buffer 280, the video audio synchronizer 282, the microphone 284, and the controller/ computer communications circuit 289. The one or more batteries 261 are charged with a charger (not shown) that can be plugged into an alternating current outlet.

In a number of embodiments, input data and/or media data is referred to herein as interactive media.

In some embodiments, the HMD 104 includes a communications circuit to facilitate peer-to-peer multichannel communication between local users via pairing. For example, the HMD 104 includes a transceiver that modulates sound signals received from the microphone 284 and sends the modulated signals via a channel to a transceiver of another HMD (not shown). The transceiver of the other HMD demodulate the signals to provide to speakers of the other HMD to facilitate communication between the users.

In various embodiments, different channels are used by the transceiver of the HMD 104 to communicate with different other HMDs. For example, a channel over which the modulated signals are sent to a first other HMD is different than a channel over which modulated signals are sent to a second other HMD.

In some embodiments, the WAC 258, the user input circuit 262, the microcontroller 268 and the video decoder 255 are integrated in one or more individual circuit chips. For example, the WAC 258, the video decoder 255 and the microcontroller 268 are integrated in one circuit chip and the user input circuit 262 is integrated into another circuit chip. As another example, each of the WAC 258, the user input circuit 262, the microcontroller 268 and the video decoder 255 is integrated in a separate circuit chip.

The various modules of the HMD are used to detect user's gaze direction and/or actions at the HMD and adjust the images presented on the display screen of the HMD to correspond with the detected gaze direction and/or actions.

The various embodiments discussed herein allow the computer 110 to receive a gesture input provided at an input interface, such as a touch interface, defined on the HMD, and in response activate an external camera to begin capturing image(s) of a user. The image of the user is captured during game play of a video game and this image of the user is rendered alongside or in place of the game content rendering on the display screen of the HMD. This image acts as a selfie image as it is captured during game play based on an input, such as gesture input, provided by the user. The selfie image of the user and a video clip capturing at least a portion of the game play may be shared with other users, allowing the other users to partake in the user's game play experience asynchronously while making them believe that they were there watching the user's game play in real-time. The video clip allows the other users to watch the user's game playing skills and the selfie image allows the other users to watch the sharing user's reaction during the game play captured in the video clip.

Figure 9:
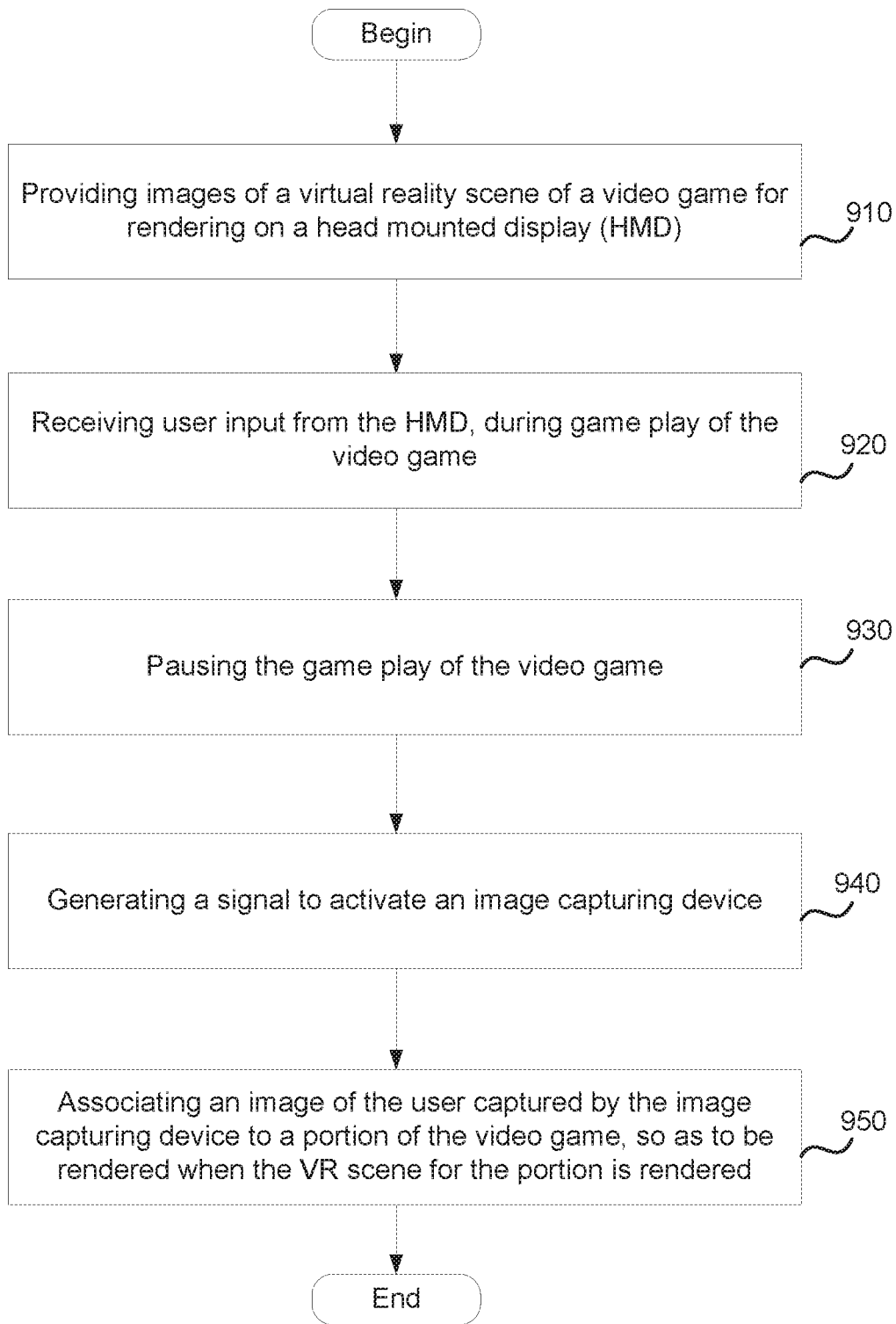
FIG. 9 illustrates an example flow of operations of a method for providing an image of a user captured during game play for rendering on a display screen of a HMD, in accordance with an embodiment of the invention.

FIG. 9 illustrates various process flow operations of a method for presenting an image of a user interacting with a video game, in one implementation. The method begins at operation 910, wherein images of a virtual reality (VR) scene of a video game are provided for rendering on a display screen of a head mounted display (HMD). The images of the VR scene are generated in response to a request for game play received from a user wearing the HMD. An instance of the video game is executed on a computer that is communicatively coupled to the HMD and data related to the VR scene is transmitted by the computer to the HMD for rendering.

A user input provided at a user interface defined on the HMD, is received during game play of the video game, as illustrated in operation 920. The user input may be a gesture input that is provided on a touch interface. The gesture input may be analyzed to determine the characteristics of the gesture input, including type of gesture input, magnitude of the gesture input provided, location of the gesture input, a length of time of gesture input provided at the touch interface, etc.

In response to receiving the gesture input, a signal to pause the game play of the video game is generated by evaluating the characteristics of the gesture input. In some implementations, the signal to pause the game may be generated when the characteristics of the gesture input meet or exceed any given pre-defined threshold value. In response to the signal, the game play of the video game is paused, as illustrated in operation 930.

In addition to generating a signal to pause the game play, a signal is generated to activate an image capturing device that is communicatively coupled to a computer on which the video game is being executed, as illustrated in operation 940. In some embodiments, the image capturing device may already be on and may be used for tracking the user in the physical space, the HMD and the controller. In such embodiments, the activation signal causes the image capturing device to take images of the user interacting in a physical space defined in the real-world environment in the vicinity of the user wearing the HMD. The interaction from the user may be used as input to the video game to affect an outcome or drive interactivity of the game, resulting in changes to the VR scene that is being rendered on the HMD.

The captured image of the user is processed and forwarded to the HMD for rendering, as illustrated in operation 950. As part of processing, the captured image of the user is associated with a portion of the game play recording of the video game that corresponds to a time when the user input was received at the user interface on the HMD. While associating the captured image to the portion of the game play recording, the image of the user may be formatted such that the image of the user may be presented alongside of the VR scene or in place of the VR scene. The captured image of the user acts as a "selfie" image that can be viewed and shared with other users either on its own or with a video clip of the game play that correspond to a time when the image was captured. The various embodiments allow the user to capture his action and reaction any time during game play and view, share it with other users in a manner similar to sharing a video clip of game play or sharing selfie image from a mobile device.

Figure 10:
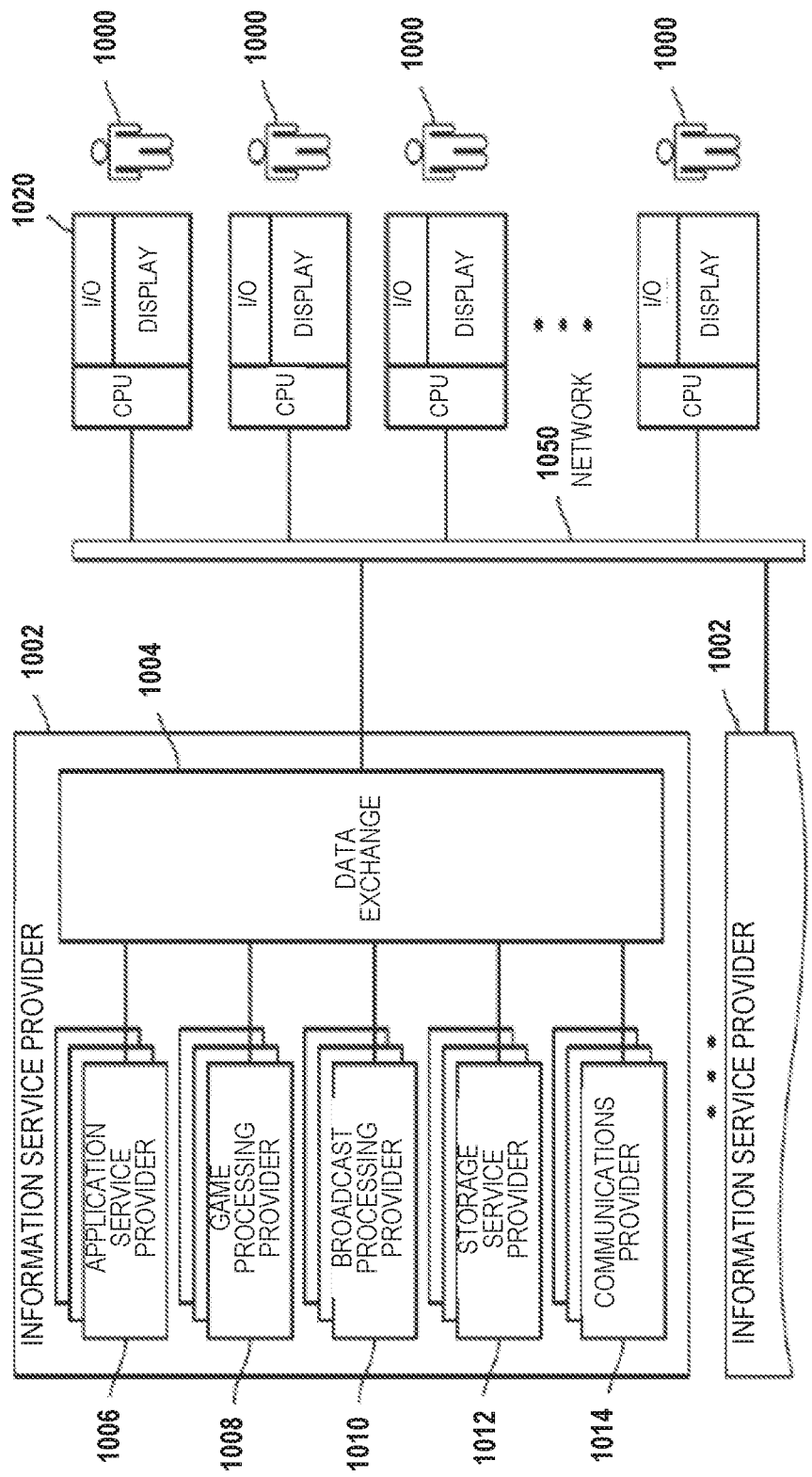
FIG. 10 illustrates an example Information Service Provider architecture for delivering informational content and services to users who are geographically dispersed and connected via network, in accordance with one embodiment of the present invention.

FIG. 10 illustrates an embodiment of an Information Service Provider architecture that may be used in providing access to different games. Information Service Providers (ISP) 1070 deliver a multitude of information services to users 1000 geographically dispersed and connected via network 1050. Although the various embodiments have been discussed with reference to providing fast access to games, the embodiments can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP (i.e., during switching of data center assigned to the user) as the client moves around the world and such transfer may be based on a compatibility of services provided by the respective ISPs to make the ISP in better position to service the user be the the one that delivers these services.

ISP 1002 includes Application Service Provider (ASP) 1006, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1002 includes a Game Processing Provider (GPPs) 1008 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPPs establishes communication between the players and their respective game-playing devices exchange information without relying on the centralized GPPs.

Dedicated GPPs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1010 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1012 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1014 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1004 interconnects the several modules inside ISP 1002 and connects these modules to users 1000 via network 1050. Data Exchange 1004 can cover a small area where all the modules of ISP 1002 are in close proximity, or can cover a large geographic area when the different modules are geographically dispersed. For example, Data Exchange 1004 can include a fast Gigabit Ethernet (or faster) within a cabinet of a data center, or an intercontinental virtual area network (VLAN).

Users 1000 access the remote services with client device 1020, which includes at least a CPU, a memory, a display and I/O. The client device can be a PC, a mobile phone, a netbook, tablet, gaming system, a PDA, etc. In one embodiment, ISP 1002 recognizes the type of device used by the client and adjusts the communication method employed. In other cases, client devices use a standard communications method, such as HTML, to access ISP 1002.

Figure 11:
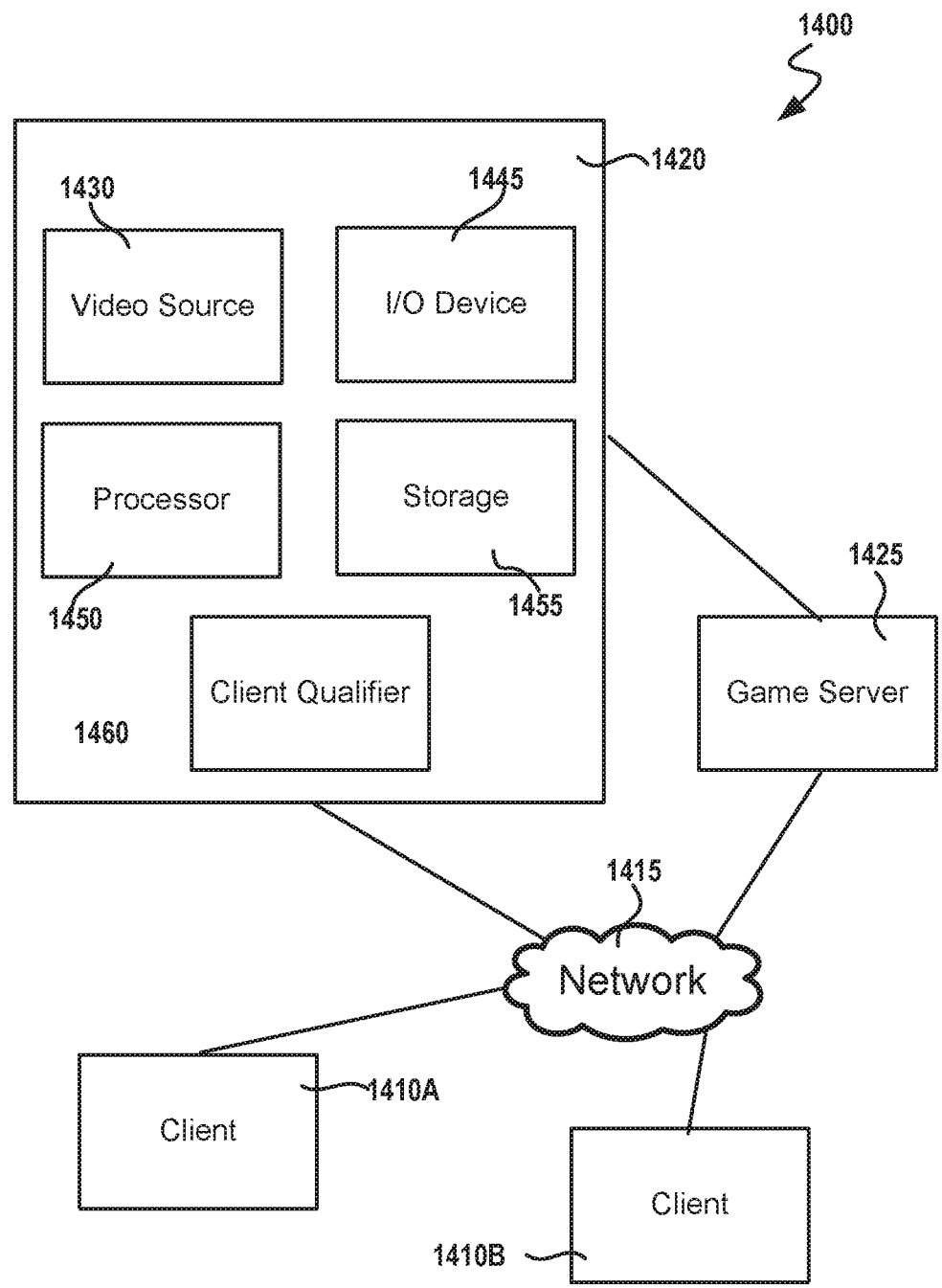
FIG. 11 illustrates a simplified block diagram of an example Game System, in accordance with various embodiments of the invention.

FIG. 11 is a block diagram of a Game System 1400, according to various embodiments of the invention. Game System 1400 is configured to provide a video stream to one or more Clients 1410 (1410A, 1410B, etc.) via a Network 1415. The Network 1415 is similar to the Network 200 illustrated in FIG. 1. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change instantly with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive coded video streams, decode the video streams, and present the resulting video to a user, e.g., a player of a game. The processes of receiving coded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually coded prior to communication to Clients 1410. For example, the raw video may be coded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

With the above embodiments in mind, it should be understood that the invention may employ various computer-implemented operations involving data stored in computer systems. These operations include operations requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. Alternately, the computer readable code may be downloaded from a server using the data exchange interconnects described above. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing content for head mounted display (HMD) use, comprising:
   providing images of a virtual reality (VR) scene of a simulation as video frames for rendering on a display screen of the HMD, the images of the VR scene generated in response to interactions received during play of the simulation, from a user wearing the HMD;
   generating a signal to activate an image capturing device to capture an image of the user while the user is interacting in a physical space during the play, wherein the image capturing device is external to the HMD and is oriented toward the user; and
   processing the image of the user received from the image capturing device, wherein the processing includes associating the image of the user to a portion of the play of the simulation and automatically generating a video clip to include the portion of the play with the associated image of the user,
   wherein generating the video clip includes,
      formatting the image of the user and the images of the VR scene included in the portion of the play so as to cause the images of the VR scene rendered on the display screen to be gradually faded out and the image of the user gradually brought into focus,
   wherein operations of the method are performed by a processor of a computer that is communicatively coupled to the HMD and is executing the simulation.

2. The method of claim 1, wherein associating the image includes linking the image of the user to a specific video frame of a recording of the play, the linking of the image to the specific video frame and the recording are stored in a local buffer during play.

3. The method of claim 1, wherein the image of the user is stored in a local buffer with a time code and retrieved to generate the video clip, the image of the user is linked to a specific video frame within the video clip, the specific video frame identified to correspond with the time code when the image of the user was captured.

4. The method of claim 3, wherein a length of the video clip of the recorded game play is pre-defined or user-defined.

5. The method of claim 1, wherein the other users are identified from a social network of the user or from a game network to which the user belongs or from a game network site, or from a website.

6. The method of claim 1, wherein processing the image includes associating one or more rendering characteristics to the image of the user and modifying one or more rendering characteristics of the images of the VR scene included in the portion of the play to which the image of the user is associated, the processing of the image causes the images of the VR scene of the simulation to fade out of view and the image of the user to be brought into view.

7. The method of claim 6, wherein a speed of fading the VR scene out of view and bringing the image of the user into view is based on type of the simulation, or one or more attributes of the user input, or intensity of the VR scene, or any combinations thereof.

8. The method of claim 1, wherein the signal to activate the image capturing device is generated in response to a user input provided at a user interface associated with the HMD, during play of the simulation.

9. The method of claim 8, wherein the user input is a gesture input that includes a forward swipe, a button press, a single tap, a directional swipe, a double tap, a triple tap, a finger press, or any combinations thereof.

10. The method of claim 8, further including,
receiving a second user input provided at the user interface of the HMD, the second user input is used to deactivate the image capturing device, wherein the second user input is a backward swipe or a directional swipe or a single tap or a double tap or a triple tap or a button press or a finger press or any combinations thereof.

11. A method for processing content for head mounted display (HMD) use, comprising:
providing images of a virtual reality (VR) scene of a simulation for rendering on a display screen of the HMD, the images of the VR scene generated in response to a request for play of the simulation received from a user wearing the HMD;
capturing an image of the user interacting in a physical space during the play, the image captured by an image capturing device that was activated to capture the image of the user during play, wherein the image capturing device is external to the HMD and is oriented toward the user;
processing the image of the user received from the image capturing device, wherein the processing includes associating the image of the user to a portion of the play of the simulation, the association allowing the image of the user to be shared with the portion of the play, wherein processing the image further includes,
formatting the image of the user and the images of the VR scene so as to render the image of the user in a first portion of the display screen of the HMD and the images of the VR scene in a second portion of the display screen during play of the simulation, the image of the user being presented for a pre-defined period of time; and
after expiration of the pre-defined period of time, reformatting the images of the VR scene so as to render the images of the VR scene on the display screen of the HMD, the images of the VR scene being presented without the image of the user.

12. The method of claim 11, wherein the image capturing device is a video camera and the image of the user is captured as a video stream, the sharing of the image includes,
generating a video clip for the portion of the play from a recording of the play stored in a local buffer, the video stream including the image of the user being associated with specific ones of video frames included in the video clip; and
sharing the video clip with the associated image of the user with other users, wherein the other users are identified from a social network of the user, or from a game network in which the user is a member.

13. The method of claim 11, wherein processing the image includes adjusting the image of the user by flipping the image of the user horizontally so as to cause the image of the user to switch from a mirror view orientation to a reverse mirror view orientation.

14. The method of claim 11, further includes receiving a second image of the user interacting in the physical space, the second image captured by a second camera that is external to the HMD, the image from the second camera used with the image from the image capturing device to generate a three-dimensional image of the user interacting in the physical space, the three-dimensional image of the user stored for the play for sharing with other users or for posting to a website.

15. A system, comprising:
a computing device including:
a memory to store code of a simulation;
a processor that is configured to,
execute an instance of the simulation and generate video frames of a virtual reality (VR) scene of the simulation for rendering on a display screen of a head mounted display (HMD) coupled to the computing device, for viewing;
receive user interaction during play of the simulation, the user interaction used to drive interactivity of the simulation;
a signal generator that is configured to:
generate a signal to activate an image capturing device that is communicatively coupled to the computing device, the activation enables the image capturing device to capture an image of a user interacting in a physical space, during play of the simulation; and
an image data processor that is configured to receive the image of the user and process the image of the user for rendering on a display screen of the HMD, wherein the processing of the image includes associating the image of the user to a portion of the play of the simulation.

16. The system of claim 15, wherein the image data processor of the computing device is further configured to:
retrieve a video clip from a recording of play stored in a local buffer of the memory, the video clip includes the portion of the play of the simulation when the signal is generated; and
link the image of the user to the video clip by identifying a video frame of the VR scene captured in the video clip, and associating the image of the user to the identified video frame, wherein the video frame of the VR scene that corresponds with a time when the signal is generated, is identified using a timeline.

17. The system of claim 15, further includes:
an input analyzer that is configured to:
receive a user input provided at an user interface of the HMD during play of the simulation;
analyze the user input and forward the analyzed user input to the signal generator to generate the signal.

18. The system of claim 17, further includes:
a first communication device that is used to:
transmit the video frames of the VR scene to the HMD for rendering on the display screen associated with the HMD;
receive interaction data from the HMD, the interaction data includes user input provided at a user interface of the HMD and user interaction provided through the HMD as part of play;
receive user interaction provided at a controller communicatively coupled to the HMD, during play;
forward the user interactions provided through the HMD and the controller to the processor for driving interactivity of the simulation; and
forward the user input to the input analyzer, the user input analyzed and used to generate the signal for activating the image capturing device.

19. The system of claim 15, further includes:
a second communication device that is configured to:
establish a communication channel with the image capturing device so as to communicate the signal to activate the image capturing device; and receive the image of the user interacting in the physical space during play, from the image capturing device.

20. The system of claim 15, wherein the image data processor is further configured to generate a rendering signal that is used to adjust a speed at which the image of the user is brought into view when rendered in a region on the display screen of the HMD and a speed at which the portion of the VR scene that corresponds to the region is faded out of view.

21. The system of claim 15, further includes a social media application interface that is used to access social network of a user in order to identify social contacts of the user, the image data processor configured to share the video clip linked with the image of the user, with the identified social contacts of the user.

22. The system of claim 15, wherein the image capturing device is a video camera.

23. A method for processing content for head mounted display (HMD) use, comprising:
providing images of a virtual reality (VR) scene of a simulation for rendering on a display screen of the HMD, the images of the VR scene generated in response to a request for play of the simulation received from a user wearing the HMD;
tracking gaze direction of the user using a gaze detection camera that is directed toward one or both eyes of the user wearing the HMD;
when the gaze direction of the user is directed toward a pre-defined area on the display screen of the HMD and the gaze detection lasts for a pre-defined amount of time, generating a signal to activate a plurality of image capturing devices, wherein the plurality of image capturing devices includes at least one forward facing camera of the HMD and at least one image capturing device that is external to the HMD, the plurality of image capturing devices is oriented to capture an image of the user interacting in a physical space, the images captured by the plurality of image capturing devices used to generate a three-dimensional image of the user; and
rendering the three-dimensional image of the user at the pre-defined area on the display screen of the HMD and rendering images of the VR scene in remaining area of the display screen,
wherein operations of the method are performed by a processor of a computer that is communicatively coupled to the HMD and is executing the simulation.

* * * * *